(12) United States Patent
Virkar et al.

(10) Patent No.: US 9,082,083 B2
(45) Date of Patent: Jul. 14, 2015

(54) MACHINE LEARNING METHOD THAT MODIFIES A CORE OF A MACHINE TO ADJUST FOR A WEIGHT AND SELECTS A TRAINED MACHINE COMPRISING A SEQUENTIAL MINIMAL OPTIMIZATION (SMO) ALGORITHM

(71) Applicant: DIGITAL INFUZION, INC., Gaithersburg, MD (US)

(72) Inventors: Hemant Virkar, Potomac, MD (US); Karen Stark, Arlington, MA (US); Jacob Borgman, West Newbury, MA (US)

(73) Assignee: DIGITAL INFUZION, INC., Gaithersburg, MD (US)

( * ) Notice: Subject to any disclaimer, the term of this patent is extended or adjusted under 35 U.S.C. 154(b) by 0 days.

(21) Appl. No.: 13/747,281

(22) Filed: Jan. 22, 2013

(65) Prior Publication Data

US 2013/0238533 A1 Sep. 12, 2013

Related U.S. Application Data

(63) Continuation of application No. 12/557,344, filed on Sep. 10, 2009, now Pat. No. 8,386,401.

(60) Provisional application No. 61/095,731, filed on Sep. 10, 2008.

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
USPC ..................................... 706/12, 20, 45–48, 62
See application file for complete search history.

(56) References Cited

U.S. PATENT DOCUMENTS 5,904,215 A * 5/1999 Ikeda ............................ 180/169
6,198,843 B1 * 3/2001 Nakauchi et al. ............. 382/167
(Continued)

OTHER PUBLICATIONS

Piao, Minghao, et al. "Application of Classification Methods for Forecasting Mid-Term Power Load Patterns." Advanced Intelligent Computing Theories and Applications. With Aspects of Contemporary Intelligent Computing Techniques. Springer Berlin Heidelberg, 2008. 47-54.*

*Primary Examiner* — David Vincent
(74) *Attorney, Agent, or Firm* — Arent Fox LLP

(57) ABSTRACT

Methods for training machines to categorize data, and/or recognize patterns in data, and machines and systems so trained. More specifically, variations of the invention relates to methods for training machines that include providing one or more training data samples encompassing one or more data classes, identifying patterns in the one or more training data samples, providing one or more data samples representing one or more unknown classes of data, identifying patterns in the one or more of the data samples of unknown class(es), and predicting one or more classes to which the data samples of unknown class(es) belong by comparing patterns identified in said one or more data samples of unknown class with patterns identified in said one or more training data samples. Also provided are tools, systems, and devices, such as support vector machines (SVMs) and other methods and features, software implementing the methods and features, and computers or other processing devices incorporating and/or running the software, where the methods and features, software, and processors utilize specialized methods to analyze data.

6 Claims, 19 Drawing Sheets

(56) References Cited

U.S. PATENT DOCUMENTS

| | | | |
|---|---|---|---|
| 6,275,761 B1 * | 8/2001 | Ting | 701/59 |
| 7,574,409 B2 * | 8/2009 | Patinkin | 706/12 |
| 7,788,195 B1 * | 8/2010 | Subramanian et al. | 706/20 |
| 7,809,723 B2 * | 10/2010 | Liu et al. | 707/736 |
| 8,024,415 B2 * | 9/2011 | Horvitz et al. | 709/207 |
| 8,893,273 B2 * | 11/2014 | Honig et al. | 726/23 |
| 2005/0228783 A1 * | 10/2005 | Shanahan et al. | 707/3 |
| 2008/0033898 A1 * | 2/2008 | Hashimoto | 706/20 |
| 2008/0097939 A1 * | 4/2008 | Guyon et al. | 706/12 |

* cited by examiner

Fig.6

Prototype user input and results screen

Input:  Name of File of positive examples
        Name of File of negative examples
        Array format Results:
The most important genes
| Probe Id | weight |
|----------|--------|
| 8765     | 21     |
| 2364     | 14     |
| 3852     | 10     |
| 8761     | 09..... |

Your query returned the following matches:
| Array ID | Exper ID | Tissue type  | Rank |
|----------|----------|--------------|------|
| 2310     | 474      | liver        | .8   |
| 7380     | 474      | liver        | .6   |
| 8432     | 123      | bone marrow  | .51  |
| 9932     | 087      | Hela cells   | .5....|

Fig. 9

Gene Pattern Probe Listing
(Supply relative expression levels)

[Submit All Levels]

| Probe | Symbol | Description | Level |
|---|---|---|---|
| 1007_s_at | DDR1 | discoidin domain receptor family, member 1 | 0 |
| 1053_at | RFC2 | replication factor C (activator 1) 2, 40kDa | 0 |
| 117_at | HSPA6 | heat shock 70kDa protein 6 (HSP70B') | 0 |
| 121_at | PAX8 | paired box gene 8 | 0 |
| 1255_g_at | GUCA1A | guanylate cyclase activator 1A (retina) | 0 |
| 1294_at | UBE1L | ubiquitin-activating enzyme E1-like | 0 |
| 1316_at | THRA | thyroid hormone receptor, alpha (erythroblastic leukemia viral (v-erb-a) oncogene homolog, avian) | 0 |
| 1320_at | PTPN21 | protein tyrosine phosphatase, non-receptor type 21 | 0 |
| 1405_i_at | CCL5 | chemokine (C-C motif) ligand 5 | 0 |
| 1431_at | CYP2E1 | cytochrome P450, family 2, subfamily E, polypeptide 1 | 0 |
| 1438_at | EPHB3 | EPH receptor B3 | 0 |
| 1487_at | ESRRA | estrogen-related receptor alpha | 0 |
| 1494_f_at | CYP2A6 | cytochrome P450, family 2, subfamily A, polypeptide 6 | 0 |
| 1598_g_at | GAS6 | growth arrest-specific 6 | 0 |
| 160020_at | MMP14 | matrix metallopeptidase 14 (membrane-inserted) | 0 |
| 1729_at | TRADD | TNFRSF1A-associated via death domain | 0 |
| 1773_at | FNTB | farnesyltransferase, CAAX box, beta | 0 |
| 177_at | PLD1 | phospholipase D1, phosphatidylcholine-specific | 0 |

US 9,082,083 B2

MACHINE LEARNING METHOD THAT MODIFIES A CORE OF A MACHINE TO ADJUST FOR A WEIGHT AND SELECTS A TRAINED MACHINE COMPRISING A SEQUENTIAL MINIMAL OPTIMIZATION (SMO) ALGORITHM

RELATED APPLICATION DATA

This application is a divisional application of U.S. application Ser. No. 12/557,344, filed on Sep. 10, 2009, which claims priority to U.S. Provisional Application No. 61/095,731, filed on Sep. 10, 2008. The contents of the prior applications are incorporated herein by reference in their entirety.

BACKGROUND OF THE INVENTION

1. Field of the Invention

Aspects of present invention generally relate to methods and systems for training machines to categorize data, and/or recognize patterns in data, and to machines and systems relating thereto. More specifically, exemplary aspects of, the invention relate to methods and systems for training machines that include providing one or more training data samples encompassing one or more data classes, identifying patterns in the one or more training data samples, providing one or more data samples representing one or more unknown classes of data, identifying patterns in the one or more of the data samples of unknown class(es), and predicting one or more classes to which the data samples of unknown class(es) belong by comparing patterns identified in said one or more data samples of unknown class with patterns identified in said one or more training data samples. Also provided are tools, systems, and devices, such as support vector machines (SVMs) and other features and methods, software implementing the features and methods, and computers incorporating the features and methods and/or running software, where the features and methods, software, and computers utilize various aspects of the present invention relating to analyzing data.

2. Description of Related Art

Machine learning is the study of how to create computers that learn from experience, and modify their activity based on that learning (as opposed to traditional computers, for which activity typically will not change unless the programmer explicitly changes it). As is known in the art, learning machines comprise software programs, for example, that may be trained to generalize using data with known outcomes. Trained learning machine software programs may then be applied to cases of unknown outcome for prediction. For example, a learning machine may be trained to recognize patterns in data. Learning machines may be trained to solve a wide variety of problems across a variety of disciplines.

Bioinformatics is one example of the use of machine learning techniques to maximize the information that may be derived from biotechnology data. Bioinformatics enables researchers to better manage and utilize vast amounts of biological information. Techniques for large-scale biology have resulted, for example, in enormous gene expression data repositories containing many separate studies by different groups. Researchers are often unable to adequately query this data because they lack proper tools.

Scientists have discovered that the root cause of many serious diseases is change in a person's gene expression resulting, for example, in a cancerous tumor, Multiple Sclerosis, or diabetes, and so methods of searching gene expression data could result in significant progress in developing treatments for these and other conditions. Currently, only a limited number of methods are available for searching across diverse gene expression experiments. These experiments may include, for example, a study of diseased vs. normal tissue, the exposure of tissue culture cells to chemical compounds, or relationships between expression patterns in diseased cells and normal expression in other types of cells and search methods may be difficult to implement, even where these experiments were conducted using the same type of array format. A machine learning based querying method is needed that could, among other things, facilitate scientific discovery and help identify treatments for a variety of medical conditions by recognizing patterns contained in this data.

BLAST (Basic Local Alignment Search Tool) is an example of a simple searching tool that provides a method for rapid searching nucleotide and peptide databases. BLAST is a sequence comparison software program, optimized for speed, which is used to search sequence databases for optimal local alignments to a query. Sequence alignments provide a powerful way to compare novel sequences with previously characterized genes, and both functional and evolutionary information can be inferred from well-designed queries and alignments. Since the BLAST software program local as well as global alignments, regions of similarity embedded in otherwise unrelated proteins can be detected. BLAST has provided a useful tool for searching nucleotide and peptide databases, but more sophisticated tools are needed to search gene expression data.

Among methods of pattern recognition, the support vector machine (SVM) has been proven to have exceptional performance as a classifier, and can tackle a wide range of problems. (Vapnik, *Statistical Learning Theory*, John Wiley and Sons, Inc. (1998).) SVMs are a form of machine learning invented by Boser, Guyon, and Vapnik. (*Proceedings of the 5th Annual ACM Workshop on Computational Learning Theory*, pp. 144-152 (1992).) SVMs were first applied to gene expression samples to create trained classifiers (Brown, et al., *Proc Natl Acad Sci USA*, 97:262-7 (2000); Furey, et al., *Bioinformatics*, 16:906-14 (2000)).

While SVMs and other machine learning tools have gained popularity in recent years, the methods remain primarily used for microarray analysis and classification, and have not been fully developed to optimize trained machines for searching and querying. Use of SVMs for data mining is largely limited to text, such as for use in examination of protein names (Shi and Campagne, *BMC Bioinformatics*, 6:88 (2005)). 'Data mining' in microarray contexts usually refers to such tasks as retrieving an important gene list from within an experiment (e.g., Frank et al., *Bioinformatics*, 20:2479-2481 (2004)), not to the querying of a repository for similar and/or distantly related data patterns. Current searching methods still rely largely on annotations, descriptive information, or values ranges for specific fields, and large amounts of data are therefore often not being utilized.

Some existing machine learning techniques utilize SVMs that allow pattern-matching within a single type of experiment, and SVMs have proven superior to many supervised and unsupervised methods at classification based on subtle relationships in data. But SVMs require advancements in generalization, speed, performance and automation to enable their effective use by scientists to query large, varied databases for both exact and merely similar matches.

Existing methods also typically rely heavily upon knowledge of mathematics by the end user in order to optimize the application of machine learning to data. In the current state of the art, the efficient use of machine learning algorithms requires knowledge and understanding of the mathematical techniques on the part of the end user to optimize results. In particular, the choice of which trained machine is most likely to generalize well to data of unknown category is often a difficult one. Also, a determination of which features in the data are the most important, and how many and which should be used in training is normally a complex problem that is challenging even to those well skilled in the art. Accordingly, there remains an unfilled need for tools that can be used directly and effectively by research and biomedical personnel who do not have special training in mathematics.

Various machine learning systems and methods have been developed, including those described below.

U.S. Pat. No. 5,649,068 discloses systems and methods for pattern recognition using support vectors. Decision systems based on the dual representation mathematical principle are described, where the principle permits some decision functions that are weighted sums of predefined functions to be represented as memory-based decision function. Using this principle, a memory-based decision system with optimum margin is designed where weights and prototypes of training patterns of a memory-based decision function are determined such that the corresponding dual decision function satisfies the criterion of margin optimality.

U.S. Pat. No. 6,228,575, U.S. Pat. No. 6,924,094, and U.S. Pat. No. 7,252,948 disclose methods for making chip-based species identifications and phenotypic characterizations of microorganisms using arrays of oligonucleotides, and assessing differences in hybridization between organisms.

U.S. Pat. No. 6,789,069 discloses methods for using a learning machine to extract information from large amounts of biological data, in which training data and test data is pre-processed in order to add dimensionality or to identify missing or erroneous data points. After training of the learning machine using the training and test data has been confirmed, live data is pre-processed and input into the trained learning machine in order to obtain information. The learning machine may be one or more SVMs.

U.S. Pat. No. 7,062,384 discloses methods of classifying high-dimensional biological data obtained from biological samples, using a least squares-based dimension reduction step followed by a logistic determination step. The methods may be used to make univariate or multivariate classifications.

U.S. Pat. No. 7,117,188 discloses methods for identifying patterns in biological systems using SVMs and Recursive Feature Elimination (RFE). The methods include pre-processing of the data sets by correcting or eliminating missing or erroneous data points. The pre-processing of the data sets may also include adding dimensionality to training data by adding new coordinates to the vector, which may be derived by applying a transformation to the original coordinates.

U.S. Pat. No. 7,318,051 discloses methods for feature selection in a learning machine. The methods include a pre-processing step to reduce the quantity of features to be processed. The feature selection methods include RFE, minimizing the number of non-zero parameters, evaluating a cost function to identify a subset of features compatible with constraints imposed by the learning set, unbalanced correlation score, and transductive feature selection. Features remaining after feature selection are used to train the learning machine.

U.S. Publ. Appl. No. 2003/0207278 discloses methods for diagnosing diseases by obtaining high dimensional experimental data, filtering the data, reducing the dimensionality of the data, training a supervised pattern recognition method, ranking and choosing individual data points, and using the data points to determine if unknown data indicates a disease condition, a predilection for a disease, or a prognosis regarding a disease.

U.S. Publ. Appl. No. 2004/0058376, U.S. Pat. No. 6,733,969, and U.S. Pat. No. 6,303,301 disclose methods for mapping relationships among genes by parallel monitoring of gene expression. The methods include detecting expression of downstream genes in reference cells and target cells to determine expression patterns, and comparing those expression patterns to detect functional mutations.

U.S. Publ. Appl. No. 2005/0131847 discloses methods for pre-processed feature ranking for an SVM. The features are pre-processed to minimize classification error, and to constrain features used to train the SVM. After training, live data is processed using the SVM.

U.S. Publ. Appl. No. 2005/0287575 discloses methods for improving the determination of the genotype of a biological sequence. The methods include receiving intensity data for probe features on an array, applying filters to the intensity values, applying models to the intensity values to determine the genotype of each feature, and combining the genotype determinations to make a final genotype determination. The reliability of the genotype determination is tested.

U.S. Publ. Appl. No. 2006/0064415 discloses a data mining platform including a plurality of modules, where each module includes an input data component, a data analysis engine for processing the input data, an output component for outputting results of the data analysis, and a web server to access and monitor the modules within the platform and provide communication amongst the modules. Each module processes a different type of data.

U.S. Publ. Appl. No. 2007/0026406 discloses methods for classifying multi-dimensional biological data, which can be used to predict a biological activity or biological state. The methods include providing a plurality of gene expression datasets associated with a first class of compounds having a first biological activity, providing a plurality of gene expression datasets associated with a second class of compounds having a second biological activity, deriving a linear classification rule based on the plurality of gene expression datasets, and applying the linear classification rule to a set of gene expression levels associated with a compound of interest in order to determine whether the compound of interest has the first biological activity or the second biological activity.

U.S. Publ. Appl. No. 2007/0203861 discloses a method for operating a computer as an SVM in order to define a decision surface separating two classes of a training set of vectors. The method includes associating a distance parameter with each vector of the SVM's training set, where the distance parameter indicates the distance of its associated vector from the opposite class.

U.S. Publ. Appl. No. 2007/0276610 discloses a method for classifying genetic data. The method for class prediction is based on identifying a nonlinear system that has been defined for carrying out a given classification task. Information characteristic of exemplars from the classes to be distinguished is used to create training inputs, and the training outputs are representative of the class distinctions to be made. Nonlinear systems are found to approximate the defined input/output relations, and these nonlinear systems are then used to classify new data samples.

These systems and methods provide complex data processing, but rely upon inefficient techniques, such as expansion of training data and selection of optimum machines based on test data sets. Accordingly, there remains a great need in the art for tools and methods for using machine learning techniques to efficiently recognize patterns in data, and/or categorize data based on pattern recognition. The ability of a learning machine to discover knowledge from data is limited by the type of algorithm selected. Accordingly, there is also a need for methods and systems for selecting and/or creating an appropriate algorithm for a learning machine. There remains a need in the art for accurate methods for estimating the success of a trained machine using training data alone, which can be easily automated. Methods are also lacking that allow for the creation of hypothetical patterns and searching data to see if such patterns, or similar patterns, exist in actuality.

Methods, systems and devices are needed to manipulate the information contained in the databases containing data generated by investigations, for example, of proteomics and genomics. Also, methods, systems and devices are needed to integrate information from genomic, proteomic and traditional sources of biological and medical information. Such information is needed for the diagnosis and prognosis of diseases and other changes in biological and other systems.

Further, methods and compositions are also needed for treating diseases and other changes in biological systems that are identified by the trained learning machine. Once patterns or the relationships between the data are identified by the learning machines of the present invention and are used to detect or diagnose a particular disease state, diagnostic tests, including gene chips and tests of bodily fluids or bodily changes, and methods and compositions for treating the condition are needed.

SUMMARY OF THE INVENTION

Aspects the present invention meet the above-identified unmet needs of the art, as well as others, by providing tools and methods and systems for recognizing patterns in complex data, such as biological data and image data, and conducting searches for information of interest contained within that data. In particular, aspects of the present invention comprise methods and systems of using a learning machine for diagnosing and prognosing changes in biological systems such as diseases. Further, once the information contained in the data is identified, the specific relationships discovered are used to diagnose and prognose diseases, and methods of detecting and treating such diseases are applied to the biological system.

According to a first aspect of the invention, machine learning methods are provided that include providing one or more training data samples having one or more known classes; training two or more learning machines to identify said one or more known classes using said one or more training data samples; and selecting the trained learning machine that optimizes a performance function dependent on one or more variables between said one or more known classes selected from the group consisting of maximizing divergence between the classes of data, n-fold cross validation, number of support vectors chosen, Vapnik-Chervonenkis (VC) dimension, ratio of all support vectors to unbounded support vectors, relative magnitude of the parameters concerned, favoring a large sigma for a Gaussian kernel, and small upper bound for Lagrange multipliers of each point. According to this aspect of the invention, the selected trained learning machine may be output on an output device. Alternatively, according to this aspect of the invention, the selected trained learning machine may be used to conduct a query of data contained in a database to identify data corresponding to said one or more known classes, followed by outputting data identified by the query as corresponding to said one or more known classes on an output device.

According to some aspects of the invention, machine learning methods are provided that include providing one or more data patterns; providing one or more data samples; training two or more learning machines to identify which of the one or more data samples correspond to the one or more data patterns; and selecting the trained learning machine that identifies which of the one or more data samples correspond to the one or more data patterns by optimizing a performance function dependent on one or more variables selected from the group consisting of maximizing divergence between the classes of data, n-fold cross validation, number of support vectors chosen, Vapnik-Chervonenkis (VC) dimension, ratio of all support vectors to unbounded support vectors, relative magnitude of the parameters concerned, favoring a large sigma for a Gaussian kernel, and small upper bound for Lagrange multipliers of each point. According to this aspect of the invention, the selected trained learning machine may be output on an output device. Alternatively, according to this aspect of the invention, the selected trained learning machine may be used to conduct a query of data contained in a database to identify data corresponding to said one or more data patterns, followed by outputting data identified by the query as corresponding to said one or more data patterns on an output device.

According to still further aspects of the invention, the one or more training data samples having one or more known classes are subjected to feature reduction prior to training to form training data samples each having differently reduced dimensionality, and wherein the two or more learning machines are trained using said training data samples having differently reduced dimensionality. According to a further aspect of the invention, the trained machine may be selected by comparing the training data sets, or the features of the training data sets.

According to another aspect of the invention, machine learning methods are provided that include providing one or more training data samples having one or more known classes; training two or more learning machines using said one or more training data samples; selecting the trained learning machine that produces the optimal result by comparing one or more factors derived from training; and outputting the selected trained learning machine on an output device.

According to yet another aspect of the invention, methods of analyzing biological and medical information, such as the gene expression data provided by microarrays, are provided. These methods may be used to identify relationships between gene expression and disease states, and to prepare kits for testing for specific diseases by measuring expression levels of genes identified as being associated with the diseases. Methods of treating diseases by administering one or more therapeutic agents that modulate expression levels of genes identified as being associated with the diseases are also provided. Methods of conducting drug discovery based on the relationships identified using the methods of the invention are also provided.

According to another aspect of the invention, a hypothetical learning method includes providing one or more hypothetical data patterns, providing one or more data samples representing one or more unknown classes, identifying patterns in said one or more data samples of unknown class, and measuring the similarity of the data sample with said one or more hypothetical data patterns.

According to still another aspect of the invention, a system for producing trained learning machine is provided, where the system includes a module for providing one or more training data samples having one or more known classes; a module for training two or more learning machines using said one or more training data samples; a module for selecting the trained learning machine that maximizes a performance function dependent on a variable, such as divergence between the classes of data; and an output device for outputting the selected trained learning machine on an output device. According to some aspects, the output device is a display device (such as a computer screen), a printer, a recordable medium (such as a floppy disk or hard drive), or any other output form known to those skilled in the art.

According to a further aspect of the invention, a computer program product is provided, where the computer program product includes a computer usable medium having control logic stored therein for causing a computer to produce a trained learning machine, the control logic including a first computer readable program code means for providing one or more training data samples having one or more known classes; a second computer readable program code means for training two or more learning machines using said one or more training data samples; a third computer readable program code means for selecting the trained learning machine that maximizes a performance function dependent on a variable, such as divergence between the classes of data; and a fourth computer readable program code means for outputting the selected trained learning machine on an output device. According to some aspects, the output device is a display device (such as a computer screen), a printer, a recordable medium (such as a floppy disk or hard drive), or any other output form known to those skilled in the art.

Other novel features and advantages in accordance with aspects of the present invention will become apparent to those skilled in the art upon examination of the following or upon learning by practice thereof.

BRIEF DESCRIPTION OF THE DRAWINGS

For a more complete understanding of aspects of the present invention, the needs satisfied thereby, and the features and advantages thereof, reference now is made to the following description taken in connection with the accompanying drawings.

FIG. 6 is a prototype of a screen showing user input and search results that may be output by the methods, software, and in accordance with aspects of the present invention.

FIG. 9 is a prototype of a screen for user input of a hypothetical pattern based on hypothetical relative expression levels for one or more genes to be queried or searched by a computer program, in accordance with aspects of the invention.

DETAILED DESCRIPTION OF THE PREFERRED EMBODIMENTS

Figure 1:
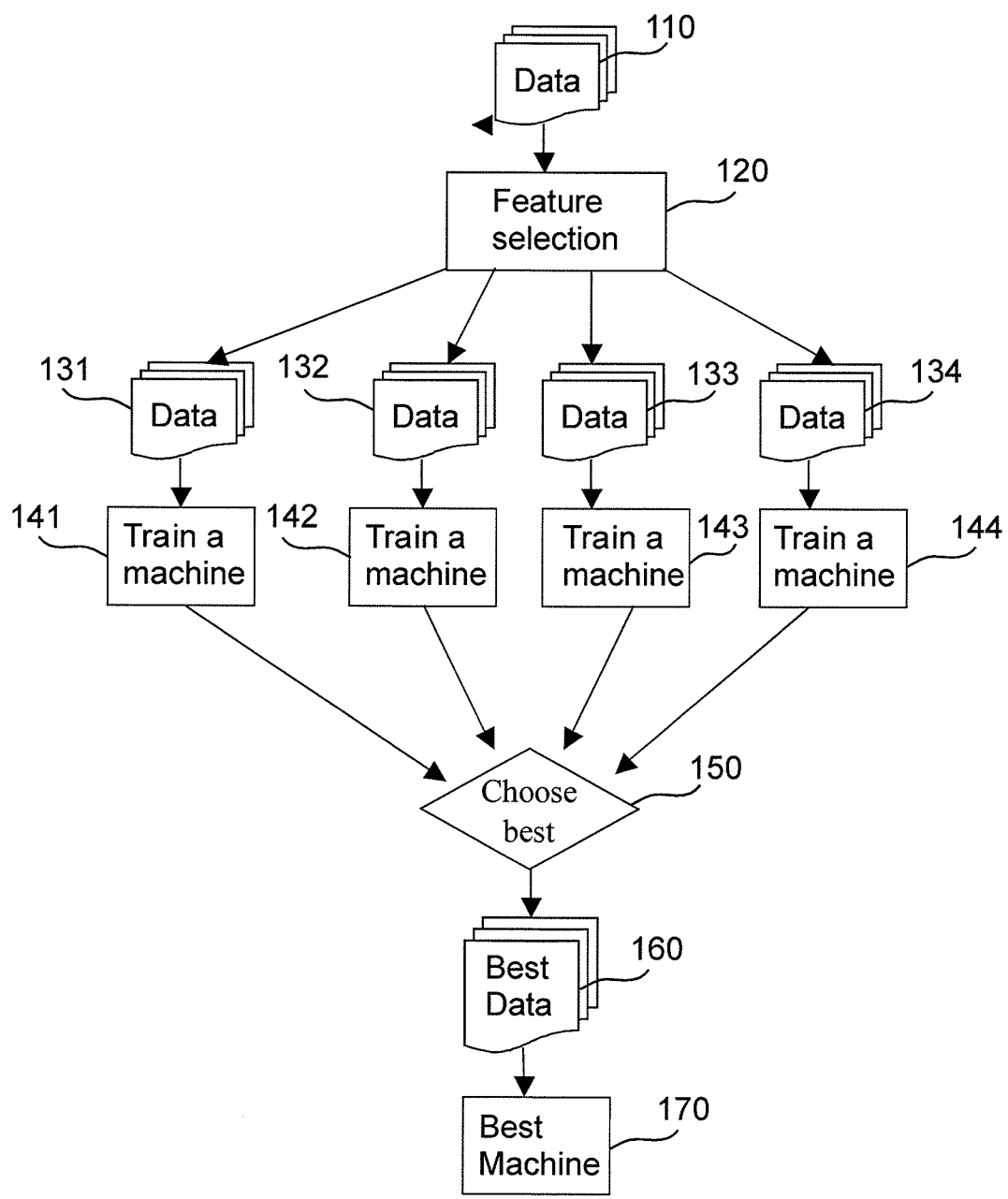
FIG. 1 is an exemplary flow chart depicting a machine learning method for training a machine to analyze complex data in accordance with aspects of the invention.

Aspects of the present invention generally relate to methods and systems for training machines to categorize data, and/or recognize patterns in data, and to machines and systems so trained. More specifically, aspects of the invention relate to methods and systems for training machines that include providing one or more training data samples encompassing one or more data classes, identifying patterns in the one or more training data samples, providing one or more data samples representing one or more unknown classes of data, identifying patterns in the one or more of the data samples of one or more unknown classes, and predicting one or more classes to which the data samples of one or more unknown classes belong by comparing patterns identified in said one or more data samples of unknown class with patterns identified in said one or more training data samples. Also provided are tools, systems, and devices, such as support vector machines (SVMs) and other features and methods, software implementing these features and methods, and computers incorporating and/or running the software, where the methods, features, software, and computers utilize various aspects of the present invention to analyze data.

In particular aspects of, the present invention are directed to methods, systems and devices for knowledge discovery from data using learning machines that are provided with information regarding biological systems. More particularly, aspects of the present invention comprise methods of use of such knowledge for diagnosing and predicting changes in biological systems, such as diseases. Additionally, aspects of the present invention relate to methods, compositions and devices for applying such knowledge to testing and treating individuals who exhibit changes in their individual biological systems.

Although evaluation of biological systems is one exemplary implementation, the methods, systems, and devices in accordance with aspects of the present invention may find application in at least the following areas: climate data, document classification, document similarity, financial data mining, geospatial data, goal-based planners, handwriting and character recognition, information retrieval, population data, search engines, speech recognition, strategy-based domains such as business, military, and games, vision recognition, and any other fields characterized by the need to analyze large volumes of data.

I. Definitions

As used in the specification and claims, the following terms have the following meanings, unless the context of use clearly dictates otherwise:

Accuracy. Ability of a trained learning machine to correctly recognize a pattern in data, or recognize a class to which data belongs and can be defined as the percentage of samples which the trained learning machine correctly classifies. The trained learning machines in accordance with some exemplary effects of the present invention achieve at least 60% accuracy, preferably at least 70%, more preferably at least 80%, still more preferably at least 90%, still more preferably at least 95%, still more preferably at least 96%, still more preferably at least 97%, still more preferably at least 98%, still more preferably at least 99%, and most preferably 100%. Relative accuracy may be assessed by a performance function dependent on one or more variables, selected from the group consisting of leave one out, leave two out, divergence, cross validation, etc.

Class. A category to which a data sample belongs. A data sample may belong to more than one category.

Data. Information useful in the context of the present invention may be derived from sources that include, but are not limited to, biological data, chemical data, population data, financial data, climate data, image data, auditory data, etc. According to a preferred embodiment the data is genetic data, and according to a more preferred embodiment the data is obtained from microarrays.

Database. A compilation of data encompassing multiple data samples. The data samples may belong to one or more classes, and/or may exhibit one or more patterns.

Dimension. Data may encompass more than one feature, or numerical component of the data, where the number of features corresponds to the dimensionality of the data. Data encompassing "n" different dimensions may be described as "n-dimensional." The number of dimensions of data may be increased or decreased in order to optimize the information that may be obtained from the data.

Divergence. A numerical measure of the degree of separation between classes of data. Divergence may be based on one or more features that characterize the classes. The divergence is optimized in order to identify the most efficient learning machine. Divergence may be recognized by differences in about 10-90% of features that are used to characterize the class, preferably about 20-80% of features, more preferably about 30-70% of features, and most preferably about 40-60% of features. Divergence is "optimized" in order to find the maximum divergence between classes. The optimization consists of a search over parameters which adjust the trained machine.

Feature in the content of variables. A variable used individually or in combination with one or more additional variables to identify a pattern or class to which data correspond. The variable is further defined by a value. For example, "gender" may be a feature in a data set, which may have a possible discrete value of "male," "female," or "unknown." Other features may have continuous values, such as "intensity" which may have a numeric value.

Feature reduction. A category of techniques used to generate a set of training data that optimizes performance of a learning machine through elimination of features, which is effective so long as a sufficient number of features remain to identify the pattern or class.

Filter. A filter method can be applied prior to a classification method to select or reduce features in the data. A filter typically uses a different method and/or other features than those used by the classifier.

Generalization. The ability of learning machine trained using a training data set to categorize and/or recognize patterns in data contained in a new test data set or in a live data set. A trained learning machine has achieved acceptable generalization if it is able to categorize and/or recognize patterns in a test data set or live data set accurately. More generally, the ability to extend knowledge discovered on the current training data set to novel data.

Kernel. Mathematical function, method, or software program used to define an inner product between any two samples of a dataset. The kernel function is thus a measure of the similarity between samples, mapping their two sets of features a real number.

Live Data. Data encompassing unknown class(es). Live data may be presented to a trained machine for the purpose of knowledge discovery.

Machine Learning. Any of several methods, devices, and/or other features which are optimized to perform a specific informational task (such as classification or regression) using a limited number of examples of data of a given form, and are then capable of exercising this same task on unknown data of the same type and form. The machine (e.g., a computer) will learn, for example, by identifying patterns, categories, statistical relationships, etc., exhibited by training data. The result of the learning is then used to predict whether new data exhibits the same patterns, categories, statistical relationships. Examples include neural networks, SVMs, decision trees, hidden Markov models, Bayesian networks, Gram Schmidt, reinforcement-based learning, genetic algorithms, and cluster-based learning.

Overfitting. Error introduced in training by making the trained machine too specific to the training data set, so that ability of the trained machine to generalize is adversely affected. as corresponding to a pattern or class, resulting in misclassification of live data and/or test data, or improper pattern recognition in live data and/or test data. Overfitting may be caused, by training using a training data set that contains incorrect or missing data, by choosing features that are too selective, or by having too few samples in the training data, as well as by other factors affecting training.

Pattern. A group of at least two common features with similar relative or absolute values exhibited by data. A given data sample may be recognized as meeting the parameters of more than one pattern. Data may share a pattern with data from a particular class without belonging to the class.

Supervised Learning. Learning that occurs when training data is labelled to reflect the "correct" result, i.e., that the data belongs to a class or exhibits a pattern. Supervised learning techniques may include neural networks, SVMs, decision trees, hidden Markov models, Bayesian networks, etc.

Test Data. Data set encompassing known class(es) that is used to determine if a trained learning machine is able to identify patterns in data and/or classify data. The test data set is preferably generated independent from the training data set.

Training Data. Data set (of known or unknown class) used to train a learning machine. Regardless of whether the class of the data is known or unknown, the data may be adequate for training a learning machine if it includes, for example, at least 1 positive example for each class, at least 2 positive examples, at least 5 positive examples, at least 10 positive examples, at least 20 positive examples, or at least 30 positive examples. Regardless of whether the class of the data is known or unknown, in some variations, the data adequate for training a learning machine if it includes at least at least 1 negative example for each class, at least 2 negative examples, at least 5 negative examples, at least 10 negative examples, at least 20 negative examples, or at least 30 negative examples.

Unsupervised Learning. Learning that occurs when training data is not labelled to reflect the "correct" result, i.e., there is no indication within the data itself as to whether the data belongs to a class or exhibits a pattern. Unsupervised learning techniques may include Gram Schmidt, reinforcement-based learning, cluster-based learning, etc.

Weight. A measure of the usefulness of information provided by a feature in identifying a pattern in data or categorizing data.

Wrapper. A method of selecting features for use by a classifier that uses the results of the classifier, as opposed to a filter method that chooses features prior to creating a classifier and uses a different algorithm than the classifier. Thus the method is 'wrapped' around the classifier.

II. Machine Learning Methods

The machine learning methods in accordance with aspects of the present invention may encompass a variety of approaches, including supervised and unsupervised methods. The machine learning methods may be carried out using, for example, neural networks, SVMs, decision trees, hidden Markov models, Bayesian networks, Gram Schmidt, reinforcement-based learning, cluster-based learning, genetic algorithms, and any other suitable learning machines known in the art.

Aspects of the present invention encompass methods for choosing the best trained machine from a set of trained machines. Some variations encompass choosing the best trained machine from a set of trained machines that each vary by the number of features used in the training data, thus indirectly choosing the best feature set. These methods can include predicting which machine will generalize well to data of unknown category, where the choice is made without resort to separate sets of 'test' data of known category, but is based upon evaluation of the trained machines produced by training using the training data. Aspects of the invention further encompass methods for automating this choice so that it may be leveraged by those with little to no knowledge of mathematics.

Multiple methods may be used to create the pool of trained machines from which the choice is made. These can include methods of feature selection and reduction, ranking of features, random generation of feature sets, correlations among features, ICA and PCA, parameter variation, and any methods known to those skilled in the art.

An exemplary method in accordance with aspects of the present invention will now be described with respect to the flow chart set forth in FIG. 1.

According to one aspect of the invention, a problem is formulated in a first step. Then data 110 of similar type for each possible class is collected. Using Gram Schmidt, an SVM, genetic algorithm or any other suitable method, the amount of information to be used by the learning machine is reduced in a dimension reduction step 120 that produces data sets 131-134. By providing a smaller amount of information to the learning machine, a more focused solution can be obtained for the problem at hand. Each class within a given training set may consist of a single type of data, or multiple types of data can be combined into a single class.

Rather than use one set of pre-processed training data and training multiple machines for example, multiple sets of pre-processed training data are created, each with a differently reduced dimensionality of data, but no other differences among the training sets 131-134. Each data set contains the same samples, and the data sets differ only by the features included in the data sets. Each set of training data are used to train a machine 141-144 with identical parameter and kernel settings, with the only difference being the dimension of the training data. In accordance with this embodiment, the ability of the machine to generalize is not enhanced by the expansion, increased dimensionality, or addition of meaning to the training data, but by using training data with a more focused reduced set of information. The best set of training data 160 is preferably chosen by examining the trained machine resulting from that training data, not by use of a test set with samples of known class. Examination of the trained machines to select the best trained machine 150 and the best training data 160 is accomplished by optimizing a performance function that is dependent on a variable, which may be accomplished by using any of numerous methods or combinations of methods, such as cross-validation or maximal separation of the training data categories (divergence), but not by the use of a test set. This best set of training data 160, which contains all of the samples, and the features that yielded the best trained machine 150, is then used to train a new machine 170, in order to obtain the best machine for use in analyzing live data (data of unknown class).

These and other exemplary methods in accordance with aspects of the invention are described in greater detail below.

A. Formulating a Problem

In order to determine how to train one or more learning machines, regardless of whether supervised or unsupervised methods are utilized, a problem must first be identified. The problem may be formulated as a question having a "yes" or "no" answer, optionally leaving open the possibility that the question may be answered "unknown" in those instances where a particular data sample cannot be accurately classified by the learning machine. Also envisioned in accordance with aspects of the present invention are methods of formulating a problem in order to identify features that are important in defining the distinction between the samples, rather than providing a "yes" or "no" answer. These methods are valuable because they provide a list of features as an output, rather than providing an answer to the formulated problem. The list of features in itself is a valuable product. These features may, for example, shed light on the underlying mechanism of disease, or identify additional molecules that may be used as targets for drugs and thus be valuable information for researchers and drug developers.

Problems may be formulated in any area for which sufficient data exists to train a learning machine. Problems may be identified that relate to biological data, chemical data, population data, financial data, climate data, image data, auditory data, etc., without limitation. Once the initial problem has been formulated, other related problems may also be identified that may utilize the learning of the trained machine.

For example, a learning machine may be trained to identify individuals who have a particular cancer (or who are at risk for developing that cancer), based on expression of one or more genes associated with the particular cancer. In this example, the problem is formulated so that the learning machine can answer the question of whether a particular data sample can be categorized as belonging to a patient who has that particular cancer, or a patient who does not have that particular cancer, or optionally, a patient for whom it is not possible to determine whether the data sample corresponds to having cancer or not having cancer. The learning machine may also be trained to identify the features that affect the determination of whether a sample is cancerous or not, and the features selected during the training process may provide insight into future research direction, aid in understanding disease pathways, and offer multiple targets for drug intervention, for example.

In addition, in accordance with this example, once a machine has been trained to identify individuals who have a particular cancer, the trained machine may also be used to query other databases containing information regarding how chemical compounds modulate gene expression in order to identify potentially-therapeutic substances. This can be accomplished, for example, by querying databases and comparing the changes in gene expression that are observed for a variety of chemical compounds, where the learning machine identifies those compounds that modulate the same genes that were associated with a particular cancer during the learning process. The identified chemical compounds may then be targeted for further research.

Any number of problems may be formulated, and the problem is only limited by whether sufficient data exists to train a learning machine to classify data while meeting a minimum threshold of accuracy. One skilled in the art will appreciate that the desired minimum level of accuracy can vary depending on the nature of the problem being solved. For example, high accuracy is desirable when determining if a patient has a particular cancer or is likely to develop a particular cancer, preferably at least 75%, more preferably at least 85%, and most preferably at least 95%, in order to avoid false positives. However, lower accuracy may be permissible or even desirable when determining, for example, if certain weather patterns are likely to produce a tornado. Therefore, in accordance with some aspects of the invention, the process of formulating a problem may also include the step of determining the minimum level of accuracy desired, and may further include the step of determine the minimum amount of training data necessary to train a learning machine to meet this minimum level of accuracy.

Once a problem has been formulated, one or more learning machines may be trained to solve the problem using supervised machine learning methods, unsupervised machine learning methods, or a combination of supervised and unsupervised machine learning methods, as described below.

B. Supervised Machine Learning

Generally speaking, the supervised machine learning methods described herein relate to methods in which a machine is trained to solve a particular problem using training data for which each data sample within the training data set has been assigned a class or category. The learning is referred to as "supervised" because the correct result has already been identified, i.e., the training data has been classified or categorized.

1. Developing Training Data Set(s)

In order to train the learning machine, training data is identified for use in carrying out the training process. The training data may include data samples in which all data samples are classified as being either positive or negative; in which all data samples are classified as being positive, negative, or unknown; in which all data samples are classified as being positive or unknown; or in which all data samples are classified as being negative or unknown.

Training data may be derived from known training data sets used in the machine learning field, or may be created for a specific machine learning application by culling data from appropriate databases or other sources. This training data will also be referred to interchangeably herein as a master training data set. Training data may also be selected from repositories of data that include information about classes of data, such as GEO, from research, from clinical trials, patient health records, and other biomedical and non-biomedical sources.

For example, when training machines based on a question regarding climate data, prior data regarding conditions observed in connection with particular weather events may be combined with data regarding conditions observed in connection with other, different weather events and used as a training data set. Similarly, when training machines based on a question regarding gene expression, prior data regarding gene expression observed in patients having pancreatic cancer may be combined with data regarding gene expression observed in connection with patients having different diseases and patients who were healthy, thereby forming a training data set.

Regardless of the source of the training data, once a master training data set has been developed, that master training data set may be used to train one or more learning machines.

One common problem encountered during a broad examination of gene expression data is that the results obtained on one type of platform may not exactly match those obtained on another. For example, the kinetics by which a lengthy cDNA probe hybridizes to a sample is different from that of a 22 base oligonucleotide probe. Problems of specificity of signal and cross-hybridization are different between the systems as well. Relative signal intensities may also vary substantially; Affymetrix chips, for example, have multiple different short oligonucleotide probe sets for each gene versus a single result for a full length cDNA. Among common platforms are gene chips, beads, ink-jet, and spotted oligonucleotides or cDNAs. When data is provided in different forms, mapping may be used to minimize the problem. Within a technology platform, it may be possible to map one probe to its equivalent on another array. For example, each probe set on a U95A array may be mapped to its equivalent on a U133A array. If mapping occurs in the other direction, some genes may not have equivalents and the performance of the engine may be lessened. However, where the goal is similarity identification, performance may still be sufficient to retrieve examples of interest.

Between different technology platforms, there are likely to be greater problems, since relative signal levels may also differ. Some of these may be overcome by a combination of mapping, clustering and use of transductive learning methods to arrive at a master training data set.

According to another aspect of the invention, the master training data set may be manipulated prior to using it to train any learning machines, in order to optimize the trained learning machines produced by training using the data. The master training data set may be altered in order to reduce the number of dimensions associated with the data (i.e., remove noise or irrelevant features), or to enhance the number of dimensions associated with the data (i.e., addition of features that may be relevant to the formulated problem).

When dimension reduction is performed on the master data set, it is performed such that multiple different data sets are generated. Preferably, each data set having reduced dimensionality has been differently reduced as compared to each other data set having reduced dimensionality, so that no data set is identical to another data set. When dimension enhancement is performed on the master data set, it is performed such that multiple different data sets are generated. Preferably, each data set having enhanced dimensionality has been differently enhanced as compared to each other data set having enhanced dimensionality, so that no data set is identical to another data set.

The amount of information to be used by the learning machine may be reduced using Gram Schmidt, an SVM, genetic algorithm or any other method. By providing a smaller amount of information to the learning machine, a more focused solution can be obtained for the problem at hand. Each example within a given training set may consist of a single type of data, or multiple types of data can be combined into a single example.

Rather than use one set of pre-processed training data and training multiple machines, multiple sets of pre-processed training data are created, each with a differently reduced dimensionality of data, but no other differences among the training sets. Each set of training data are used to train a machine with identical parameter and kernel settings, with the only difference being the dimension of the training data. According to one variation of the invention, the ability of the machine to generalize is not enhanced by expansion, increased dimensionality, or addition of meaning to the training data, but by using training data with a more focused reduced set of information.

When dimension reduction or enhancement is carried out on the master data set, it may be preferably be carried out by reducing/enhancing one feature at a time, two features at a time, three features at a time, etc., depending on the number of reduced/enhanced data sets desired for use in training. One skilled in the art will understand that the number of reduced/enhanced data sets prepared and used to train machines will vary depending on the number of trained learning machines that are to be generated and compared, and that this number may vary depending on factors such as the computational power of the machine used to conduct the training. According to some aspects of the invention, training may be carried out using some data sets that have been reduced and some data sets that have been enhanced.

According to a further aspect of the invention, the master training data set, the reduced data sets, and/or the enhanced data sets may be supplemented by adding additional data samples. The additional data samples may include positive samples, negative samples, normal samples, or control samples, generated data samples, or a combination of these. Particularly in the medical and biological fields, it is common to have a disproportionate amount of positive samples, and relatively few normal samples or control samples, because samples from patients who are healthy that include testing of the same dimensions as the samples from sick patients are not likely to be available. This is particularly the case where the samples are obtained by biopsy or surgical removal of diseased tissue. However, these samples do contain valuable information that is not fully utilized by current methods.

SVMs trained on unequal numbers of positive and negative examples suffer poor generalization. Addition of supplemental data to the data set can be a useful tool to improve training of learning machines. The supplemental data may be derived from databases unrelated to those from which the master training data set was generated, theoretical data prepared based on general knowledge, or may be randomly-generated data. Exemplary methods of the invention therefore encompass automated as well as non-automated supplementation of negative examples to take advantage of existing studies with limited negative data.

In a further variation of the invention, the use of trained machines to query a database for similar patterns can be especially useful when the data are limited and knowledge about the underlying processes is therefore particularly difficult to obtain by common methods. This detection of similarity through querying could identify potential model systems, or similar processes occurring in other tissues, and enable future research in a more easily manipulated system. The provision of additional negative examples may prove useful in facilitating this detection of similarities. Such a method can also be used to improve querying, even if equal numbers of negative examples are available. Typical training sets include positive, and very closely related negative examples. Yet a broad query will examine samples that are even more distant. Use of an SVM for such a broadly-based query may be included, which, among other things, facilitates judgments in a broader feature space, are beneficial.

This aspect of the invention includes methods for automatically generating additional negative examples that are each assigned reduced weight. The generation can be either entirely random, or by random selection from an existing database. Because of the reduced weight, even if a positive example is accidentally chosen as a random negative example, it will not have a large impact on the performance of the classifier, whereas the combined influence of a very large number of lightly weighted negative examples may improve performance by more clearly defining the boundary of the positive examples in broad feature space.

In order to augment the negative data, a first step, for example, may be to estimate the density function of the positive class. Density estimation can be assessed by either traditional Parzen windows, or the recently developed SVM estimation. A more extensive negative class can be generated by applying importance sampling Monte Carlo methods, producing a higher rate of negative samples in regions where the positive empirical density is low. The negative data is then assigned extremely low thresholds. The expectation is that the preponderance of lightly weighted negative examples should help the SVM make decisions in broader space. Alternatively, negative data could be selected at random from actual data and assigned similarly low thresholds. In yet another embodiment of the invention, normal data space can be characterized by any of several methods, and the randomly generated data compared to it to ensure that the generated data is typical of normal data. Outlying generated samples that do not fit within typical or normal space will not be used. Similarly, samples pulled at random from the database can be compared to normal space and not used for supplementation if they are thus shown to be abnormal.

As will be appreciated by those skilled in the art, when the methods in accordance with aspects of the present invention are applied to the problem of analyzing gene expression, the selection of a gene set for querying is a balancing act between eliminating genes whose changes are noise, individual variation, or not greatly important to the disease or category of interest, while retaining a sufficient set. If the resulting trained machine is to be used for querying then the problem is more challenging because the machine will be used not just for classification of nearly identical samples, but to detect similarities and distant relationships as well. Aspects of the present invention therefore may place an emphasis on selecting sufficient numbers of features to maximize generalization, while still achieving exceptional performance.

2. Training Learning Machine(s)

Once the training data set(s) have been generated, they may be used to train one or more learning machines to find a solution to the formulated problem.

A typical learning machine trains on positive and negative examples. The trained machine can then make binary decisions (e.g., diseased or healthy) for new data created in the same way (e.g., same tissue and research protocol) as the training data. According to the supervised methods in accordance with aspects of the invention, the learning machines may be selected from neural networks, SVMs, decision trees, hidden Markov models, and Bayesian networks, although one skilled in the art will appreciate that additional learning machines may be used in accordance with the supervised learning methods.

Some methods of the invention may be carried out by training multiple learning machines of different types using the same master data set; training multiple learning machines of the same type (i.e., all are SVMs) using differently reduced/enhanced and/or supplemented training data sets; training multiple learning machines of different types using differently reduced/enhanced and/or supplemented training data sets; and combinations of these approaches. According to one exemplary variation, training is carried out using multiple learning machines of the same type (i.e., all are SVMs), where differently reduced training data sets are used for the training.

According to one method of the invention, machines such as SVMs are trained. For each machine, the resulting gradient is used to rank all features. This weights the features by influence, not by minimized error. Once ranked, the least important features are eliminated, and a new machine is retrained based on each reduced feature list. This process is repeated, and each new trained machine is evaluated as successive features are eliminated. When the list of features has been reduced down to a minimum number of features, the complete set of results is reviewed, and the best list is chosen by various criteria, such as leave out error rate, divergence between classes, etc. A final machine is trained based on the best feature list.

According to another variation, filter methods select features by criteria other than the method and/or features that perform the classification, whereas wrapper methods select using a similar method and/or features as that used for classification. Either the filter or wrapper methods may be used in accordance with aspects of the present invention, but wrapper methods have been shown to be the most accurate. However, wrapper methods are not always feasible due to speed. According to one aspect of the invention, a wrapper method has been developed and may be integrated in a query system according to one exemplary variation. This wrapper uses joint information for the discriminating powers of groups of genes, utilizing their collective response to a specific biological condition. In one variation, the information used from the trained machine is the gradient, which is the orientation of the hyperplane that forms the decision surface between the classes for an SVM. This is distinct from error minimization and can be extended to all types of kernels by using an average. The gradient values are measured by the absolute values of the components of the gradient, in which components of opposite sign but the same magnitude are weighted equally.

According to one exemplary variation of the invention, a typical support vector machine (SVM) is trained on positive and negative examples and learns to classify new data as positive or negative. Each example is the results for a single microarray containing the expression levels for every gene. Positive examples are microarrays hybridized with the biological samples of interest; negative examples are microarrays hybridized with the negative controls. The positive class is arrays whose expression patterns match the positive training examples. The negative class is arrays whose patterns match the negative controls. A feature is a single gene within the array. The success of a trained SVM at classification of microarray data not used for training shows that the SVM is not overfitted to the training examples, but can generalize what it learned to unseen data.

The SVM trains by casting the examples as vectors whose elements are the expression values for each feature (gene). Each vector defines a point in multi-dimensional feature space. The SVM uses an implicit mapping into higher dimensional space until linear separation between the classes is achieved. Similarity between all pairs of points is calculated using a kernel method, which is efficient for high dimensionality. Adjustable kernel parameters affect performance and generalization of the trained SVM. The next step is to find the boundary that optimizes the distance between positive and negative examples using SMO (sequential minimal optimization), an efficient form of the quadratic programming problem (QPP). The support vectors are the examples chosen that define the optimal boundary between classes. The trained SVM can then calculate the similarity between a new example and the support vectors to predict its class.

To improve generalization of the trained learning machine, the current invention incorporates enhancements to allow the SMO (Sequential Minimal Optimization) algorithm to adjust the influence of individual samples. The SMO algorithm, as discussed in current literature, does not allow the user to specify separate and unique upper bounds on the weights of the individual training samples. However, in accordance with the present invention, the core of the SMO may be modified in order to allow this flexibility, so that each sample may be given unique bounds. This regulates the degree of influence individual samples may have on the trained machine, while maintaining the high speed and efficiency enabled by the use of SMO.

One use for the weight adjustments within the SMO is for microarray data where occasionally a poor or noisy experiment results in a data sample that does contain some useful information but also contains a good deal of noise. It would be desirable to include this example in order to glean what information it may contain, but not to allow it to overwhelm other examples in which the experiment was freer from noise. A scientist is frequently very aware of which gene expression chips are the most reliable, but has no easy way now to incorporate that into existing machine learning software for biological data. This method allows the user to adjust the weights of samples individually, thus reducing the impact of the noise within the poorer samples, but not eliminating them from inclusion in training.

This approach can also be used to incorporate prior knowledge into the SVM in a way that is novel compared with the current state of the art. Aspects of the present invention enable a user to include information obtained by any other means about the importance of individual training samples and to incorporate this prior information into the methods and/or features in a novel way. This approach can be used to place an absolute limit on the influence of any example in the training data, for example.

This aspect of the invention may also be useful, for example, to enable a novel training method that includes providing hypothetical supplemental negative examples with low weights. A preponderance of hypothetical negative examples with low weights can offset the imbalance when many, or only, one type of examples are available for training. The low weights for the hypothetical examples of the other class ensure that even if a hypothetical negative example should actually fit within the incorrect class, its use will not unduly skew the resulting trained machine. This aspect of the invention allows the weight adjustment to take place as an integral part of the SMO.

Figure 2:
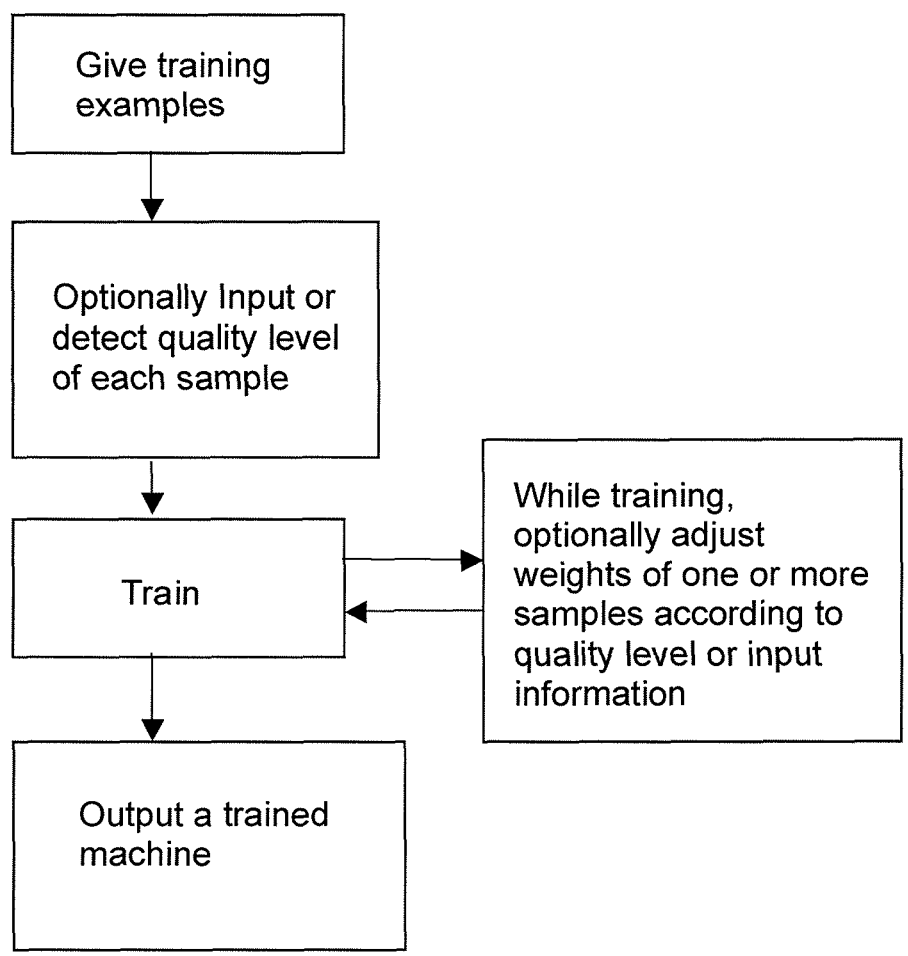
FIG. 2 is an exemplary flow chart providing a high-level overview of the process of incorporating quality measures or user input, and adjusting weights of samples during training, in accordance with aspects of the present invention.

A further use for this weight adjustment within the SMO is to deliberately skew the resulting classifier toward false positive or false negative errors, depending on the needs of the application to which it is being applied. It thus allows a highly effective method of adjusting the type of error bias to be incorporated into an efficient and speedy version of the learning features. (See FIG. 2.)

Figure 11:
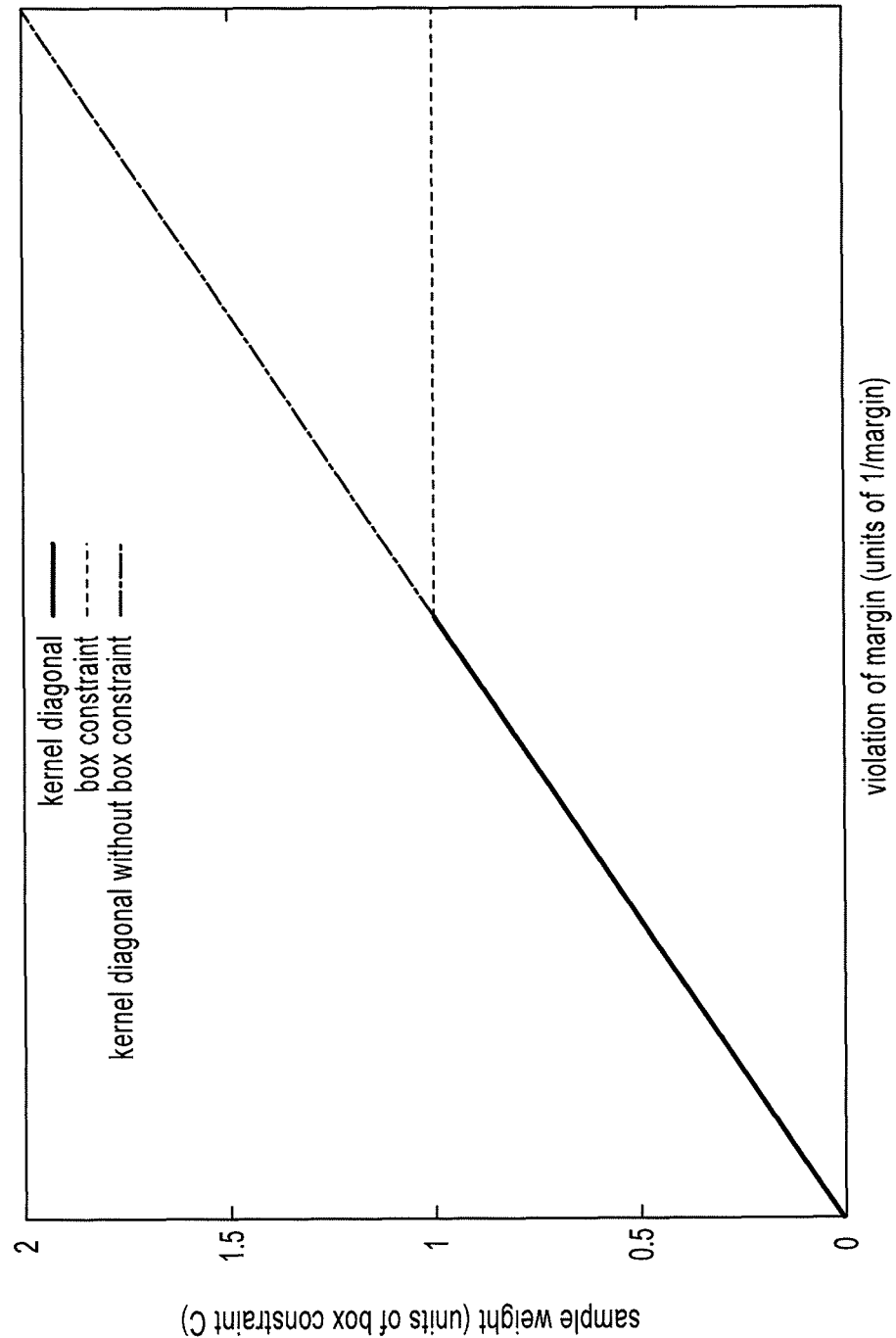
FIG. 11 is a graph depicting the effect of using the diagonal method to soften the effect of noisy data samples, in accordance with aspects of the present invention. The 'box constraint' of this example affects the weights along the kernel diagonal. The number of samples that do not 'fit' the appropriate classification margin is shown along the bottom axis, while the weight of the individual sample is given on the vertical axis. Without the box constraint, the number of samples that do not 'fit' within the classification boundaries (violations of margin) are increased (x-axis value) and their weight trends high (y-axis value), while the trend with a box constraint is for fewer violations of the margin (x-axis value) along with lower weight of the samples (y-axis value).

An alternative method for weighting samples is the diagonal method (adjusting the weights of samples in the diagonal of the kernel matrix) that has been discussed in the machine learning literature, but has not been applied to biological data for the purpose of incorporating prior knowledge for the improvement of generalization to new biological samples. (See FIG. 11.) Adjusting the weights on the matrix diagonal can regulate or soften the influence of a point, but cannot provide an upper limit on its influence. Therefore, the diagonal method is more limited and can not be used to completely control the weight with which an incorrectly classified point influences the pattern.

While more limited than the modification within the SMO to incorporate prior knowledge, the diagonal method can still prove useful for biological data under some circumstances for adjusting the influence of samples within noisy biological data sets. It is a further aspect of this invention to utilize this method alone, or in combination with the bounding method used within the SMO, or in combination with other methods for incorporating prior knowledge and/or improving generalization and/or skewing the resultant classifier toward a false positive or false negative error.

Also encompassed within aspects of this invention are methods of adjusting weights that are not dependent directly upon end user input. These methods are based on the data in the samples themselves, for example, and are thus capable of being automated.

In some variations, the samples may be ranked according to various measures of their quality, or level of noise. This ranking could be based on, for example, but not limited to, level of similarity between replicates or on experimental measures of quality included in sample data.

In the case of microarray data, for example, replicates might be duplicates of the probes on the same array, different probes on the array that are targeted at the same gene, replicates of the entire sample created by hybridizing more than one chip to the same labeling reaction, hybridizing one or more chips to each of replicate labeling reactions performed on aliquots of the same original RNA sample, or might include replicates created by having more than one original sample from the same individual or disease. Each of these different types of replicates can help assess noise introduced into the sample data by a different aspect of the process of sample creation, and each can be incorporated into a sample ranking method to adjust weight, either individually or in any desired combination.

In the case of microarray data, measures of experimental quality included in the sample data might include probes that assess for the length of the labeled material included in the chip hybridization reaction. The proportion of full length vs. shorter gene lengths represented in the labeled reaction sample is a common measure of chip quality.

Software, methods, and/or other features to automatically use the data-embedded measures of quality in a ranking scheme for weighting adjustments of the samples in the training process are also encompassed by aspects of this invention. Rankings to be used in assigning weight adjustments based on combinations of similarity of replicates, internal data quality measures and other factors are also within the scope of aspects of this invention.

Software, methods, by other features and algorithms to automate the process of converting the rankings based upon these measures, or combinations of these measures, into a weighting adjustment by, for example, the adjustments within the SMO, or adjustments to weights on the kernel diagonal, are also within the scope of aspects of this invention, but are not limited thereby.

Ranking itself need not be a simple listing of samples in order of quality, but might also include assigning weight adjustments by a table lookup where the table contains predetermined adjustments to be made, and is indexed by a measure of relative sample quality. Ranking may thus assign one or more samples and identical weight adjustment value, or an identical quality measure.

Figure 5:
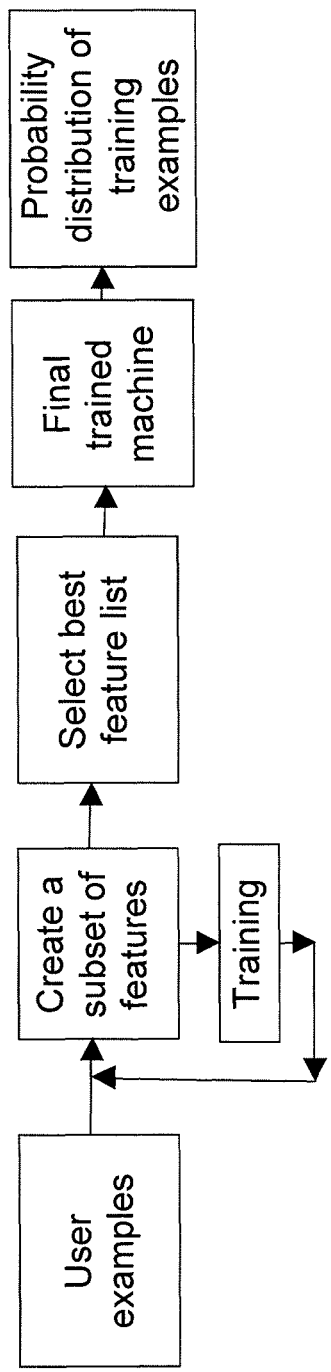
FIG. 5 is a flow chart depicting the automation of the query engine, in accordance with aspects of the present invention.

A typical SVM will output a binary decision that an example matches or does not. To accomplish ranking, an exemplary add-on module will compute, for example, the distribution of the training examples subsequent to the final training with the optimum set of parameters (FIG. 5). It will then estimate the probability for each match by comparing it to the distribution of the trained examples. This method will be further improved by changing the approach used to fit the distribution curve to the data, for example using a regression method such as SVM regression. Although always using a binary decision space, in this way output can be created that will be continuous (a probability) rather then a simple "yes" or "no." This probability gives a natural ranking to the match. A list may be produced by ranking data (e.g., each gene) according to its importance for the decision of sample class. Although the purpose of the list is to enable well-generalized querying and the detection of even distant relationships, it appears extremely valuable in its own right. In the two case studies shown in the Examples below, the ranked list produced approach revealed genes that appear to have exceptional relevance to the diseases under study, as assessed by the literature.

The methods in accordance with aspects of the present invention lead to improved generalization by not allowing a noisy or mistakenly classified point to exert undue influence on the resulting trained machine, but are a preferable alternative in some variations to eliminating those samples from training altogether since they still contain some useful information.

As a result of the training methods in accordance with aspects of the invention, each of the learning machines identifies a unique solution to the formulated problem, which may be expressed as a mathematical method and/or other features. This mathematical method and/or other features may then be useful as a classifier, or as the basis for a further data query to search for identical, similar or distantly related patterns.

As an additional result of the training methods in accordance with aspects of the invention, the underlying important features can also be identified, and this in itself is desirable information distinct from the use of the resulting trained machine as a classifier or query pattern.

C. Unsupervised Machine Learning

The unsupervised machine learning methods described with regard to some aspects of the present invention described herein relate to methods in which a machine is trained to solve a particular problem using training data for which none of the data samples within the training data set has been assigned a class or category. The unsupervised methods may also be used to solve problems for which no training data has been provided, for example, finding one or more patterns within the data that may represent different categories or classes of data.

1. Training Data Not Classified

According to one variation, the "unsupervised" machine learning method is carried out by training a learning machine to solve a problem using data for which no correct result (i.e., classification) has been identified. In this case, the learning machine must distinguish amongst data samples without the benefit of classification information and return a result indicating which data samples correspond to one or more patterns that the learning machine identifies during the training process, which data samples do not correspond to the pattern(s), and optionally, which data samples cannot be classified as either corresponding to the pattern(s) or not corresponding to the pattern(s).

a. Developing Training Data Set(s)

In order to conduct unsupervised training of the learning machine, training data is identified for use in carrying out the training process. The training data may include data samples taken from one or more data sources relevant to the problem that was identified. In the case of unsupervised learning, the data samples have not been classified prior to the training. This training data will also be referred to herein as a master training data set.

Dimension reduction may be carried out on the unclassified data in order to reduce noise or remove features that are not relevant to the formulated question, or that are not relevant to the patterns discovered while learning. Dimension enhancement may also be used to introduce features for which data is available, but is not included in the database. Such reduction or enhancement of the master training data set may be carried out in the manner described above with respect to the master training data set for supervised learning methods.

b. Training Learning Machine(s)

Once the training data set(s) have been generated, they may be used to train one or more learning machines to find a solution to the formulated problem. According to the unsupervised methods of the invention, the learning machines may be selected from Gram Schmidt orthonormalization, reinforcement-based learning, PCA, ICA, kernel versions of ICA and PCA, and cluster-based learning, although one skilled in the art will appreciate that additional learning machines may be used in accordance with the unsupervised learning methods.

The methods of some aspects of the invention may be carried out by training multiple learning machines of different types using the same master data set; training multiple learning machines of the same type (i.e., all use Gram Schmidt) using differently reduced/enhanced training data sets; training multiple learning machines of different types using differently reduced/enhanced training data sets; and combinations of these approaches. According to a one variation, training is carried out using multiple learning machines of the same type (i.e., all use Gram Schmidt), where differently reduced training data sets are used for the training. Training of the learning machines may be carried out in the manner described above with respect to the learning machine training methods for supervised learning methods.

As a result of the training, each of the learning machines identifies a unique solution to the formulated problem, which may be expressed as a mathematical method and/or other features.

2. Pattern-Based Learning

According to another variation, the unsupervised machine learning method is carried out by providing a learning machine with a pattern containing features that correspond to a class. Where a pattern is used to train the learning machine, training data are not required, although they may be utilized in conjunction with the pattern in accordance with some aspects of the invention.

Figure 10:
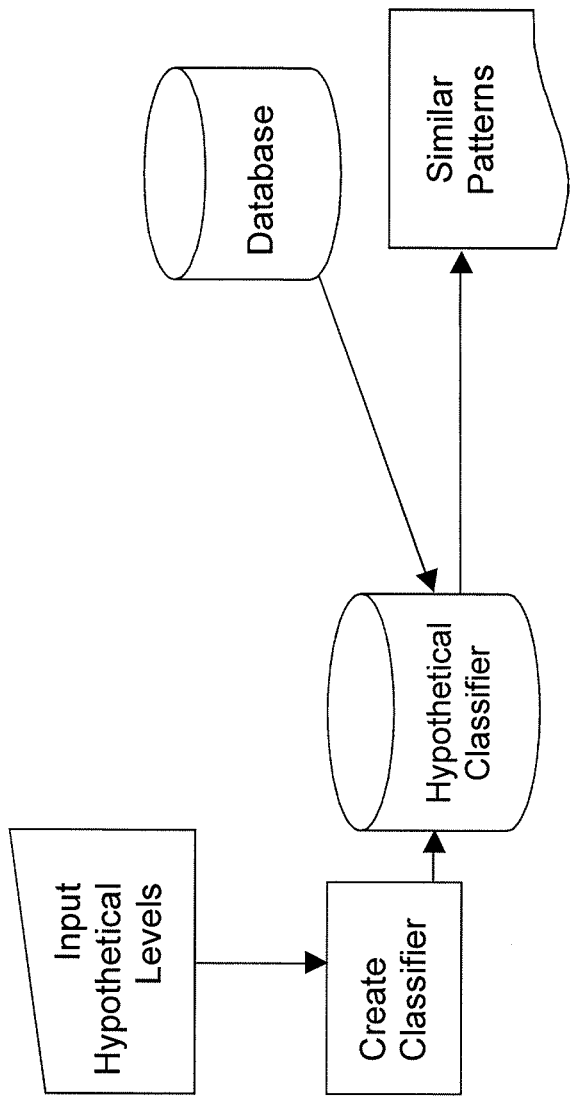
FIG. 10 is a flow chart depicting a creating and conducting a query using a hypothetical pattern (provided as a single training example) to be searched, in accordance with aspects of the present invention.

In further variations of the invention, the pattern may be a randomly-generated pattern, a hypothetical pattern, or a pattern generated by user seeking to identify data samples that exhibit the same features as a particular pattern of interest. This pattern will also be referred to as the master pattern herein (see FIG. 10). The master pattern comprises one or more features that have corresponding absolute or relative values. For example, if a researcher has been studying a gene regulation pathway and has formed a hypothesis about the relationships among a set of genes, the researcher may enter their relative expected expression levels and search for the most similar pattern in a database of gene expression experiments (see FIG. 9). The pattern may then be modified or changed based upon the similar patterns found in the search, or modified by the user manually after examination of the most similar patterns found in the search. Iterative refinements of the pattern are also an embodiment of the invention.

According to other aspects of the invention, a pattern based on features contained in data samples may be identified by a trained learning machine as corresponding to a particular class determined by the master pattern. This information regarding the pattern may then be used to train further learning machines to improve upon, enhance, or replace the provided master pattern and to identify additional data samples that match the newly improved master pattern.

In another variation of the invention, the master pattern is used to compare to a data base or set of data, and the data thus compared are assigned to classes. These examples and their assigned classes are then used as a supervised training data set, either including, or not including the original master pattern. Some of these examples may be assigned weights in the course of training as described above, resulting in one or more trained machines.

Once a master pattern is developed, its dimensionality may be reduced and/or enhanced, for example, in order to provide multiple different patterns for use in training multiple learning machines. Dimensionality reduction may be accomplished by incorporating knowledge returned by the search for similar or matching patterns, or other methods described above. One or more of the returned matches may be combined with the original master pattern and/or used alone to create a new training data set and then one or more newly trained machines, or revised master patterns, and these in turn used for dimensionality reduction.

D. Selecting the Optimum Trained Machine

Once a problem has been formulated, and multiple learning machines have been trained to solve the problem using machine learning methods selected from the group consisting of supervised machine learning methods, unsupervised machine learning methods, pattern-based learning or a combination of supervised and unsupervised, and pattern-based machine learning methods, the best or optimum machine of all the trained machines should be identified and selected for use in queries and/or classifications using real-world data.

Selection of the best or optimally-trained learning machine may be carried out using one or more of the following variables: distance measures between classes, particularly divergence (i.e., maximal separation of the training data categories), cross validation methods such as leave one out (LOO), leave two out (LTO), or n-fold cross-validation, empirical mathematical criteria, such as, for example in the case of SVMs: numbers of support vectors, or numbers of bounded support vectors, and/or measures of the stability of the trained machine measured by sensitivity of the solution to changes in the learning machine parameters. Other methods of distance measures, cross-validation, and empirical mathematical criteria may be used as well. These methods may be used in combination with the ROC curve statistics, and false positives and false negatives using LOO or LTO. A function for assessing performance may be formulated based on any of these variables, or combinations thereof.

Figure 7:
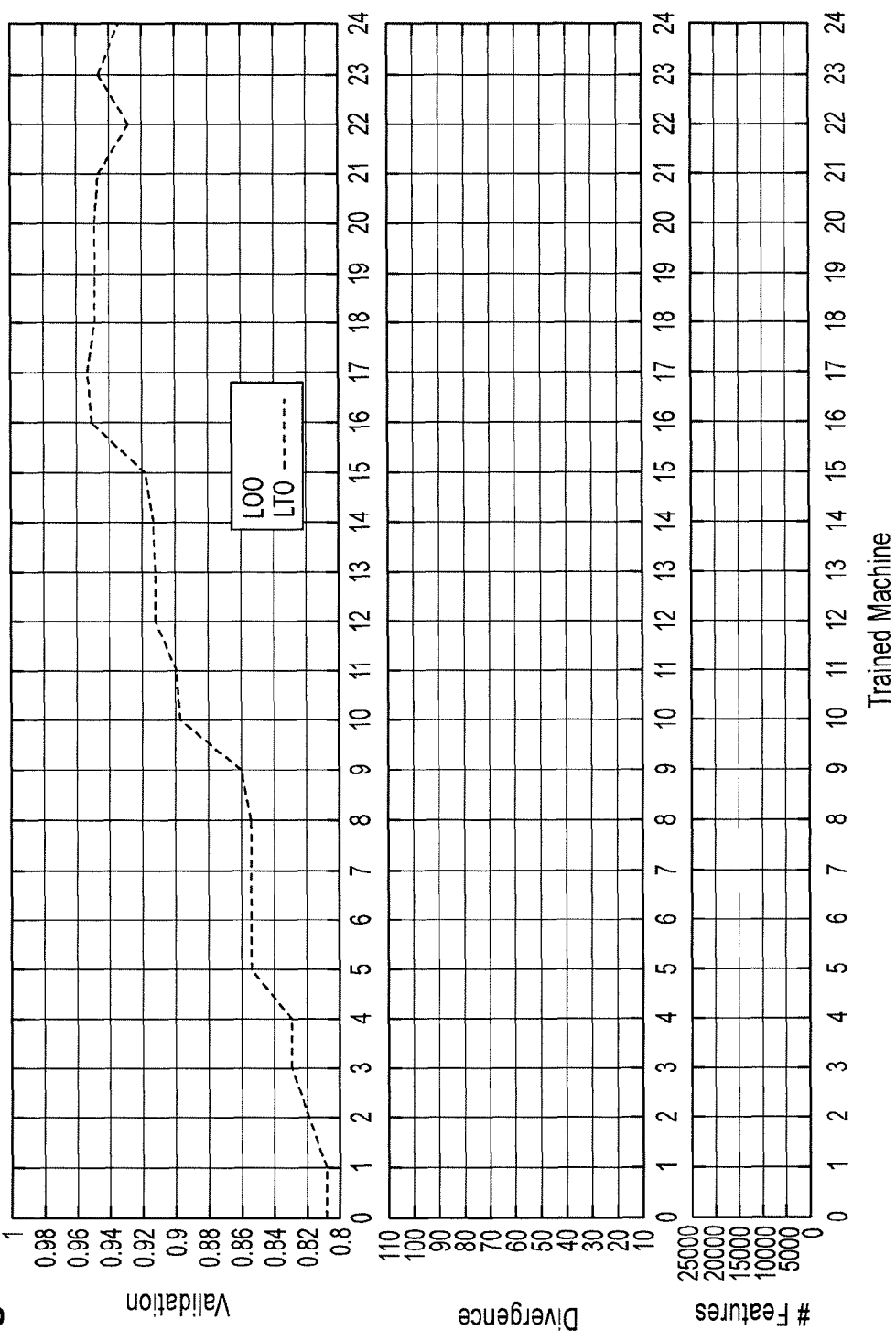
FIG. 7 shows fitness curves comparing the change in the results obtained by common cross-validation methods, such as leave-one-out and leave-two-out to divergence as the number of features varies, usable in accordance with aspects of the present invention.
Figure 8:
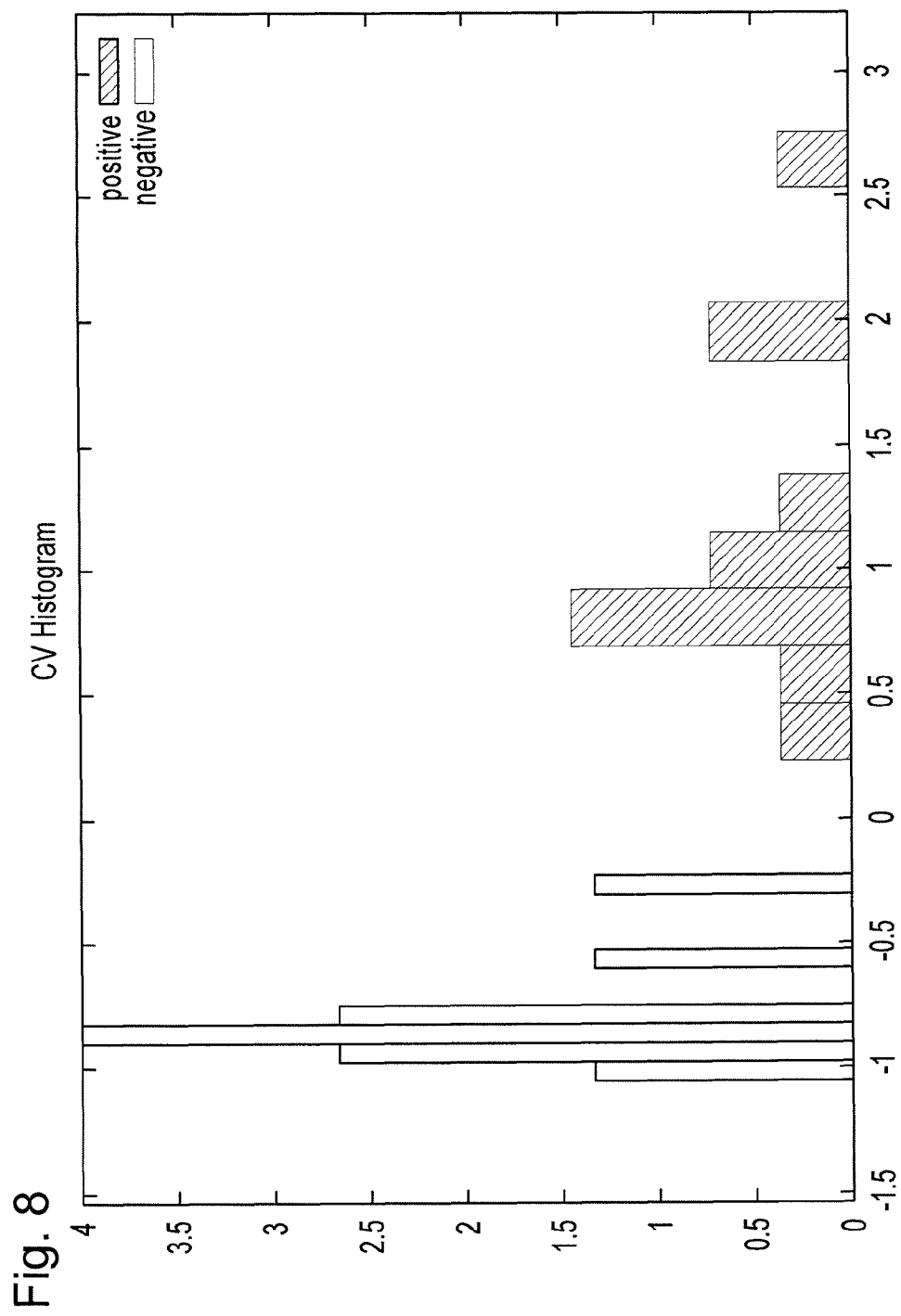
FIG. 8 is a histogram showing the results obtained by using divergence as a measure for assessing training results in accordance with aspects of the present invention. Divergence in this example takes into account the shape of the distribution of training samples shown in the figure, not merely whether the samples lie to the right or left of zero. In this example, divergence is a more information-rich way to examine training results than LOO or LTO, which only utilize positive or negative.

FIGS. 7A-7C compare the change in the results obtained by common cross-validation methods such as leave-one-out and leave-two-out (7A) to divergence (7B) as the number of features varies (7C). FIG. 8 shows the results obtained by using divergence as a measure for assessing training results. Divergence takes into account the shape of the distribution of training samples shown in the figure, not merely whether the samples lie to the right or left of zero.

According to one variation of the present invention, the optimally-trained machine is selected by using divergence (i.e., the maximal separation of the training data categories) to compare the machines. According to another variation, the optimally-trained machine is selected by evaluating the learning machines using a performance function dependent on a variable selected from the group consisting of LOO, LTO, n-fold cross-validation, number of support vectors chosen, Vapnik-Chervonenkis (VC) dimension, ratio of all support vectors to unbounded support vectors, relative magnitude of the parameters concerned, favoring a large sigma for a Gaussian kernel, small upper bound for Lagrange multipliers of each point, and divergence. According to another variation, various methods described above may be used and the method or methods providing the best discrimination among multiple trained machines is selected. This can be necessary when equal values are assigned to different machines by any one method, and the use of additional methods can be a tie-breaker. Alternatively, multiple different methods may be used to assess the trained machines, and the trained machine that is considered "best" using the most different methods is chosen as the optimally-trained machine. In a further variation, a weighted system can be used where the result by each criterion is weighted, and the sum or other combination of all values determines the optimal machine. In a further variation of this invention, this weighting system may be determined empirically, or may be created by an additional use of machine learning, such as training a neural network to determine the appropriate weights for each factor. Alternatively, multiple different methods may be used to assess the trained machines, and the trained machine that is considered "best" using the most different methods is chosen as the optimally-trained machine.

According to one aspect of the invention, the optimal trained machine may be selected by examining the separation between classes resulting from training on the training data. Each set of training data being considered differs only by the number of features included. The quality of this separation is assessed by calculating a divergence measure between the classes (classes being, for example, the positive and negative examples in the training data). In order to have a distribution on which to make a good estimation of divergence for each trained machine, multiple measurements are needed for each trained machine. Therefore, a cross-validation method, such as LOO, is used to generate multiple measurements (an empirical distribution) of divergence for each machine. Using this determination, the machine having maximal estimated divergence is selected as the optimal machine. This choice of machine is therefore based solely on the training data, no test set or set aside training data set is used.

The methods in accordance with various aspects of the present invention may use divergence to select a trained machine, but may also incorporate other factors derived from training (such as LOO and LTO success rate, percentage of samples chosen as support vectors, size of the bounds, other parameters of the machine, or numbers of features) in selecting the optimal machine. This approach can be expanded to variations the use of a neural network to choose the optimum machine. In some variations, these methods are not based upon the use of a test set with data of known class. These methods may be referred to as "meta-machines" due to the layers of machine learning involved in choosing the optimum machine.

Aspects of the present invention also encompass other possible methods to assess generalization more rigorously.

These include the number of support vectors chosen, the proportion of these that are bounded, the size of the bounds, the relative size of parameters which control the empirical loss of the SVM over its inherent complexity, the VC dimension (a complexity measure of the training space), and the Kullback-Leibler divergence between positive and negative output of the SVM. When a probabilistic SVM is used, powerful information theoretic criteria can also be used to evaluate the separation of classes.

Mathematically, the quality of separation may, for example, be assessed by calculating the symmetrized version of the Kullback-Leibler divergence between classes, using Gaussian approximations for the empirical distribution of each class. Each empirical distribution is generated from cross-validation on the training data. The symmetrized Kullback-Leibler divergence is defined as the average of the Kullback-Leibler divergence with respect to each empirical distribution. The Kullback-Leibler divergence itself is a well-known information-theoretical quantity. For Gaussian approximations to the empirical distributions, the Kullback-Leibler assumes a simple closed solution based on the first two moments of each distribution. Use of this method provides an easily automatable method to enable effective use of the algorithm by those with no mathematical knowledge.

In order to be able to evaluate the success of training for generalization, objective heuristics or other criteria that can be written in computer language and integrated into the software may be used. For example, if an SVM is to be used for querying, the criteria by which to evaluate the parameters can be established, and defined, and coded into computer software. A first step may be to consider many different ways of measuring the SVM's performance, and to select and/or weight those that give the most effective prediction of querying success. Selecting the best measures of performance, and combining them into an effective ensemble, will allow automated parameter selection.

Standard measures to be evaluated include the average error rate, sensitivity versus specificity, precision versus recall, the F1, and the area under the ROC (receiver operating characteristic). Additionally, because the output of the SVM may be probabilistic, (i.e. it will supply a probability distribution for each class), it can be trained to maximize the "distance" between these classes. This distance could be measured by the Kullback-Leiber divergence, for example. The performance can also be measured by its CVLL (cross-validated log likelihood), something a traditional non-probabilistic version cannot supply.

Beyond these accepted measures, several heuristics could be helpful in selecting the best SVM especially for generalization to enhance remote matching. Here various considerations can be useful: the number of resulting support vectors, the ratio of all the support vectors to the unbounded support vectors, or the relative magnitude of the parameters concerned (e.g., favoring a large sigma for a Gaussian kernel, or small upper bound for the Lagrange multipliers of each point, which tends minimize the chance of overfitting).

In some variations, regardless of the technique used to select the optimally-trained machine, no test data set is used to select the trained learning machines.

E. Selecting the Best Training Data/Pattern and Training a Machine

Once the best or optimally-trained machine is identified, it may either be stored and retrieved for further use, or the data or pattern or conditions used to produce that trained machine is used to recreate the optimally-trained machine (i.e., if the optimally-trained machine was an SVM, a new SVM is trained using the training data/pattern that produced the optimally-trained machine). This trained machine may then be used to conduct queries using real world data in order to identify solutions to the formulated problem, or to provide classification for new data.

F. Querying Using the Trained Learning Machine

Once a trained machine has been prepared using any of the methods described above, for example, such as supervised machine learning methods, unsupervised machine learning methods (including use of unclassified data and the use of patterns), pattern-based training or a combination of supervised and unsupervised machine learning or pattern-based training methods, a best or optimum machine may be identified and selected for use in queries using real-world data.

Such a trained machine may be used to identify patterns in complex data. According to one aspect of the invention, the queries that may be conducted as a result of the machine learning methods of the present invention may be beneficially applied to search databases containing large volumes of data to identify data that corresponds to a particular class of interest, or exhibits a similar pattern. These databases may include data regarding biological data, chemical data, population data, financial data, climate data, image data, auditory data, etc., without limitation. According to one exemplary variation, the data is gene expression information, which may be obtained, for example, from databases containing information collected from gene chips/microarrays. According to another exemplary variation, the data is genetic information, which may be obtained, for example, from databases containing information collected from gene chips/microarrays and the Human Genome Project Database.

Aspects of the present invention provide for use of a trained machine as a query method against a data repository or database. In contrast to the use of a trained machine as a binary or discrete multi-class classifier, these methods are based on ranking matches for similarity to the trained machine in a continuous fashion, and ranking the live or real world data according to its similarity to the trained pattern, rather than by its class. Aspects of the invention may also encompass the use of hypothetical patterns rather than trained patterns to be used in such queries. Some variations further provide for storage and retrieval of such patterns.

Aspects of invention provide for queries based upon combinations of one or more patterns, and for queries based upon combinations of patterns and other characteristics of the data being searched. Some variations encompass queries based upon any combination of trained patterns learned using the supervised and unsupervised training methods described above, and/or hypothetical patterns and/or other data characteristics. Some variations provide for the use of alerts as new data is added to the repository or database, comprising automated methods of flagging or notification such as by report or automated email that a new record being added to the database has a similarity to one or more query patterns, either hypothetical patterns, trained patterns or any combination thereof.

The query can accept multiple patterns, returning matches which exhibit, for example, attributes of any pattern, or joint attributes of every pattern. Boolean operators OR and AND can be included with a list of patterns, allowing the user to include or exclude certain matches. Optionally, these patterns can be assigned weighting, reflecting the user's desire to control the respective strength of a match or mismatch against a particular pattern.

Results from multiple pattern queries can be given both numerical and visual representations. They will extend the results from single pattern queries (which can return a numerical ranking for each sample, a visual hash representing a match on a histogram of the entire database, and an associated p-value for the null hypothesis of random matching). In addition, multiple pattern queries allow the user to view 2D and 3D visualizations of where the sample is located in relation to the entire database.

Aspects of the present variation also include methods of searching/querying based upon subsets of patterns. Various methods can be used to create these subsets. The variety of methods used to choose the original gene list/pattern may also be used to break the list into sub-patterns, which may be especially useful for hypothetical patterns. In addition, these methods can be used to choose the original lists, and additional methods such as clustering, correlation, anti-correlation, functional annotations, grouping by ontologies, ICA or PCA, etc., can be used to create sub-lists and sub-patterns. Querying on sub-patterns may be more informative than querying on full patterns (analogous to BLAST having regions of high similarity and regions of great divergence within a single sequence that can inform the origins or functions of the sequence), and sub-patterns may inform the origins or mechanism of the disease or other phenomenon under study.

One of the advantages achieved by some variations of the invention is that the SVM is so efficient that computationally-demanding approaches may be used to analyze the data. However, the basic machine learning core may also use other algorithms, such as Fisher discriminant and a vector between means, in addition to the SVM. These approaches are considered to provide interchangeable methods and features, and the core can run on any of them.

Automatable criteria may be established for generalization and performance of the trained SVM. An SVM is typically validated by one of three methods: use of a hold-out test set, leave-one-out (LOO) training, or k-fold multiple training sessions. Each of these estimates accuracy based on the percent success with data of known classification not used in a training session. LOO validation frequently results in a broad range of parameter settings and numbers of features that can achieve good separation on training data. K-fold sessions have shown slightly better discrimination, while the use of a hold-out set has varying success depending on the particular data and demands a greater number of labeled samples. These methods do not offer a sufficiently discriminating method of predicting the generalization of a trained machine, and there is a need for better criteria.

Also, for full automation, more rigorous criteria may be required to choose among conditions that result in full success by LOO or k-fold. Among other suggested methods are leave-two-out and an examination of the alpha values of the support vectors chosen during training.

For some implementations, speed is an essential component of the query method. Training an SVM is a computationally demanding task that must occur quickly to be feasible for a querying system. SVMs find optimum solutions by solving a quadratic programming problem (QPP) that can be slow. Some methods in accordance with aspects of the present invention may utilize a state-of-the-art solution to this problem, the SMO (Sequential Minimal Optimization) algorithm. This approach is magnitudes faster than traditional gradient-based methods.

Large-scale microarrays contain probes for tens of thousands of genes. Apparent changes in gene expression levels can result from individual patient differences, experimental variation, and noise. In the context of a query, the improved selection of a key small set of genes would enable the search to focus on the key changes occurring in the samples.

When applied to analysis of biological data, aspects of the present invention also provide a novel querying method to retrieve data from extensive microarray archives by direct searching for complex relationships in the data itself. This approach stands in contrast to methods that rely heavily on annotations, descriptions, or selection by values of chosen fields. The query technologies, for example, may be powered by a self-optimizing engine, such as an SVM, which enables use by biomedical researchers who need no knowledge of the inner workings. Although these methods will beneficially enable researches to query gene expression data, the methods could be extended to many types of biological data, such as clinical, high-throughput screening, and/or proteomics.

Figure 3:
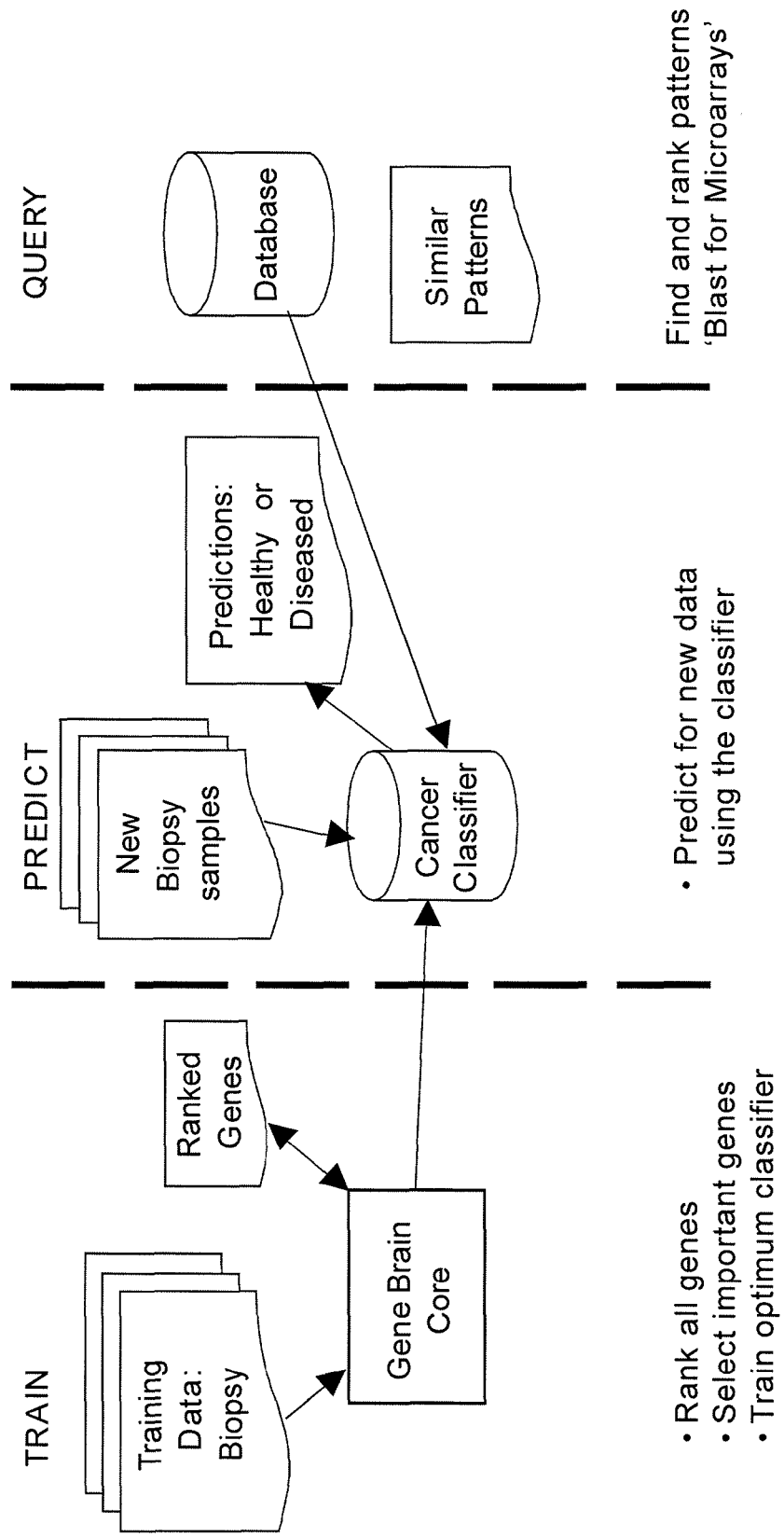
FIG. 3 is an exemplary flow chart depicting a machine learning method for identifying patterns contained in biological data in accordance with aspects of the invention.
Figure 4:
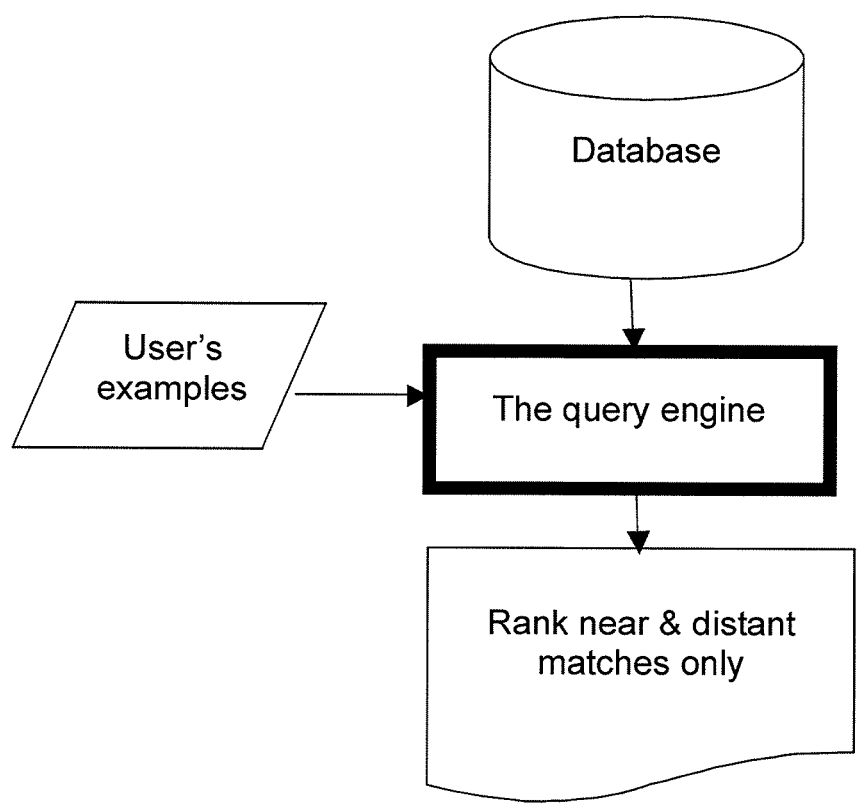
FIG. 4 is an exemplary flow chart depicting a machine learning method for identifying patterns contained in a database, based on sample information provided by a user, in accordance with aspects of the present invention. The fully automated query-by-example for databases searches directly on data in this exemplary implantation, not just based on documentation or annotations, identifies matches and ranks hits, and reports and ranks the most important results.

The core can be used to conduct repository queries, as shown in FIGS. 3 and 4. The query has been successfully prototyped and has yielded biologically significant findings. In one exemplary implementation, it will search for similar patterns to user provided examples, and does not need to find exact matches merely similar ones. It is based on just the important genes, not the entire sample pattern. The query software can also be extended beyond the use of machine learning to be able to search based on user-created 'hypothetical' patterns as well, and it will return those samples in which the pattern for the subset of the chosen important genes most closely matches the hypothetical pattern.

The searches themselves may be conducted sequentially through the data, which may be provided in a repository, it is not required to be based on a pattern-based index, although use of pattern-based indices is also envisioned in accordance with the invention.

SVMs are used in one variation as the engine of the query system for several reasons: (1) SVMs have a limited number of tunable parameters, thus automated tuning is feasible; (2) SVMs are robust to noise, important when dealing with naturally noisy and individually variant microarray data; (3) the SVM ability to detect complex patterns can be exploited to find matches in the database (4) a probabilistic SVM can be adapted to search for similarity not just exact matches and (5) feature reduction can be incorporated to improve performance. Broad searching through array repositories, even when limited to a single chip type, requires a method that is flexible, and robust to noise.

The following enhancements to the SVM may be made to adapt it for use in a query engine: the user-provided positive examples (sample microarrays) and negative examples (negative control microarrays) may be supplemented with additional negative examples before training to improve generalization. The SVM software can test, evaluate and choose its own kernel parameters without user intervention, making it self-optimizing. Novel heuristics and other criteria have been empirically derived to guide the choice. The SMO method for finding the optimum separation has been enhanced. The software assesses the contribution of each feature (gene) in the training examples to rank the feature (gene) according to its importance in determining the class. The software will select genes and automatically eliminate the irrelevant genes (feature reduction). Other methods of choosing or reducing features may be used. A trained SVM is produced using the chosen kernel parameters and the reduced set of genes. The software then accesses the database or files to obtain microarray records that used the same format array. Each of these microarray records (new examples) will be presented to the trained SVM, and be classified as positive or negative. The match will be ranked by comparing it to the distribution of the positive and negative training examples and obtaining the probability that it belongs to the positive class.

The SVM trains by casting the examples as vectors whose elements are the expression values for each feature (gene). Each vector defines a point in multi-dimensional feature space. The SVM uses an implicit mapping into higher dimensional space until linear separation between the classes is achieved. Similarity between all pairs of points is calculated using a kernel method, which is efficient for high dimensionality. Adjustable kernel parameters affect performance and generalization of the trained SVM. The next step is to find the boundary that optimizes the distance between positive and negative examples using SMO (sequential minimal optimization), an efficient form of the quadratic programming problem (QPP). The support vectors are the examples chosen that define the optimal boundary between classes. The trained SVM can then calculate the similarity between a new example and the support vectors to predict its class.

The methods in accordance with aspects of the present invention, in some variations, represent a significant advance in speed, performance and generalization. The use of more rigorous, yet still automatable criteria to assess generalization improves not only querying, but various types of machine learning applications. The supplementation of negative examples is an innovation that will impact the field of machine learning in general, and that specifically enables taking advantage of prevalent sorts of biomedical samples that lack normal controls. Further, placing all of these into the context of a broad-based query engine to permit searching based on matching data patterns provides a novel tool that enables scientists to study array data in a way analogous to that in which BLAST is used for sequence data today.

While SVMs provide one exemplary implementation of the query invention, other approaches are also encompassed by aspects of this invention. These operations are swapped into the software core, and then function analogously to the trained SVM. These approaches may include, but are not limited to, use of the Fisher Discriminant, vector between group means, relevance vector machines, Gaussian process classifier, neural networks, Bayesian neural networks, and any of the trained machines described above. Querying with a master pattern as described above is also implementable, including with the use of a hypothetical pattern. Various classifiers may be adapted for use as a query engine according to the methods described herein.

III. Software and Systems

Software in accordance with aspects of the present invention may be designed to implement various of the machine learning methods described above in section II.

The exemplary software implementing the methods in accordance with aspects of the present invention represents a new genre of querying software. Additional applications could be derived by easily adapting it to other data types, and particularly to biological data derived from sources such as clinical trials, ADME-tox, proteomics, etc. The software could also be extended to other encompass any type of pattern matching known to those skilled in the art. And it could be altered to integrate multiple types of experimental data, for example, to combine gene expression with patient blood tests and clinical outcomes.

A graphical user interface (GUI) can be created by Matlab, or other rapid prototyping method, for use as a user interface with the software. One skilled in the art will see many alternative methods for providing a GUI, a web-based, or a custom user interface. See FIG. 6 for a sample of the input and output fields that will be displayed. The user will provide the names of files containing positive and negative examples, respectively. This will be passed to the self-optimizing SVM, which, in turn, will display the results back to the user as output.

Figure 18:
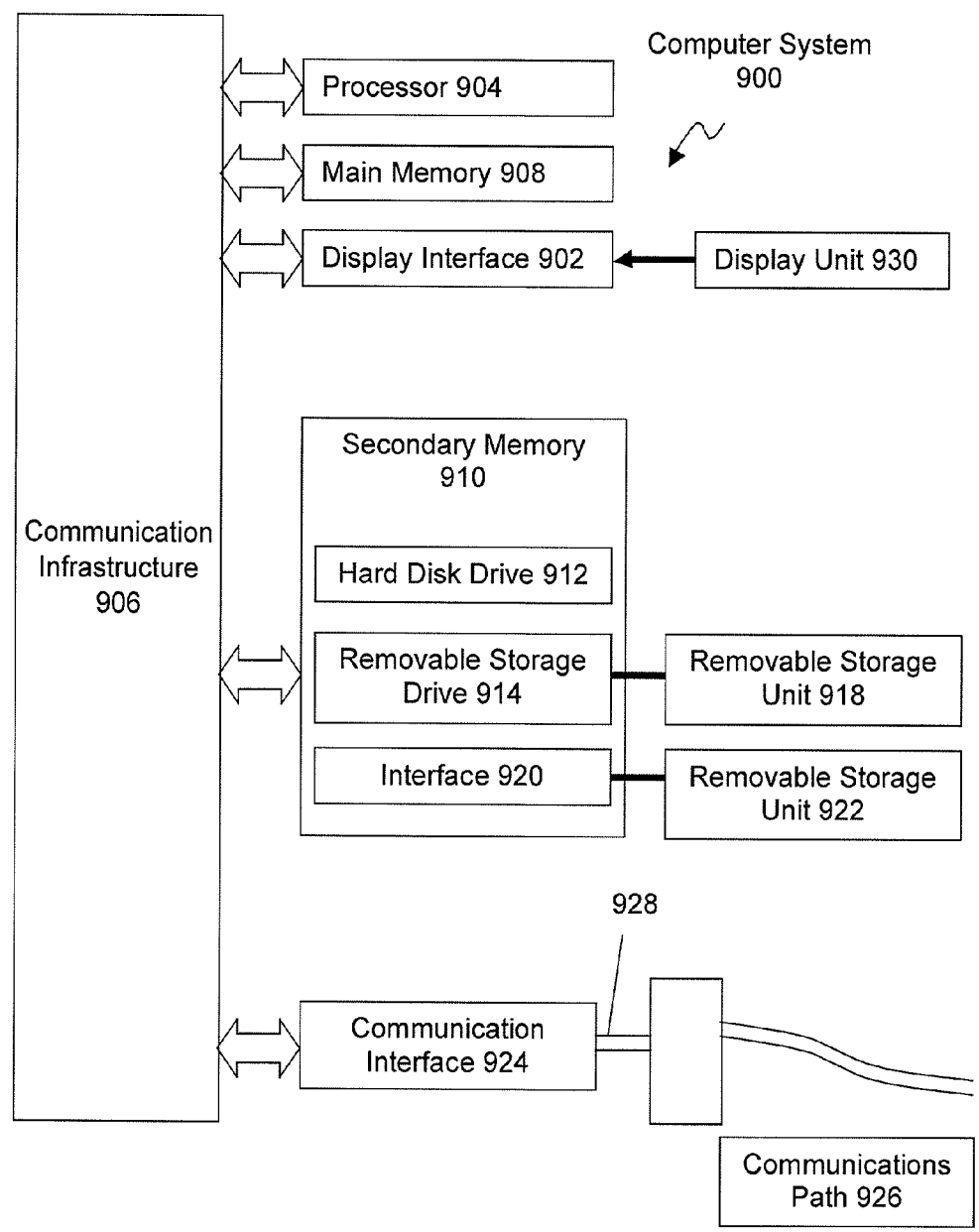
FIG. 18 presents an exemplary system diagram of various hardware components and other features, for use in accordance with aspects of the present invention.

Aspects of the present invention may be implemented using hardware, software, or a combination thereof, and may be implemented in one or more computer systems or other processing systems. In one variation, aspects of the invention are directed toward one or more computer systems capable of carrying out the functionality described herein. An example of such a computer system 300 is shown in FIG. 18.

Computer system 300 includes one or more processors, such as processor 304. The processor 304 is connected to a communication infrastructure 306 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 300 can include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 314, a hard disk installed in hard disk drive 312, and signals 328. These computer program products provide software to the computer system 300. Aspects of the invention are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 310 to perform the features of the present invention. Accordingly, such computer programs represent controllers of the computer system 300.

In an aspect where variations of the invention are implemented using software, the software may be stored in a computer program product and loaded into computer system 300 using removable storage drive 314, hard drive 312, or communications interface 320. The control logic (software), when executed by the processor 304, causes the processor 304 to perform the functions of the invention as described herein. In another aspect, some variations of the invention may be implemented primarily in hardware using, for example, hardware components, such as application specific integrated circuits (Asics). Implementation of the hardware state machine so as to perform the functions described herein will be apparent to persons skilled in the relevant art(s).

In yet another aspect, variations of the invention may be implemented using a combination of both hardware and software.

Figure 19:
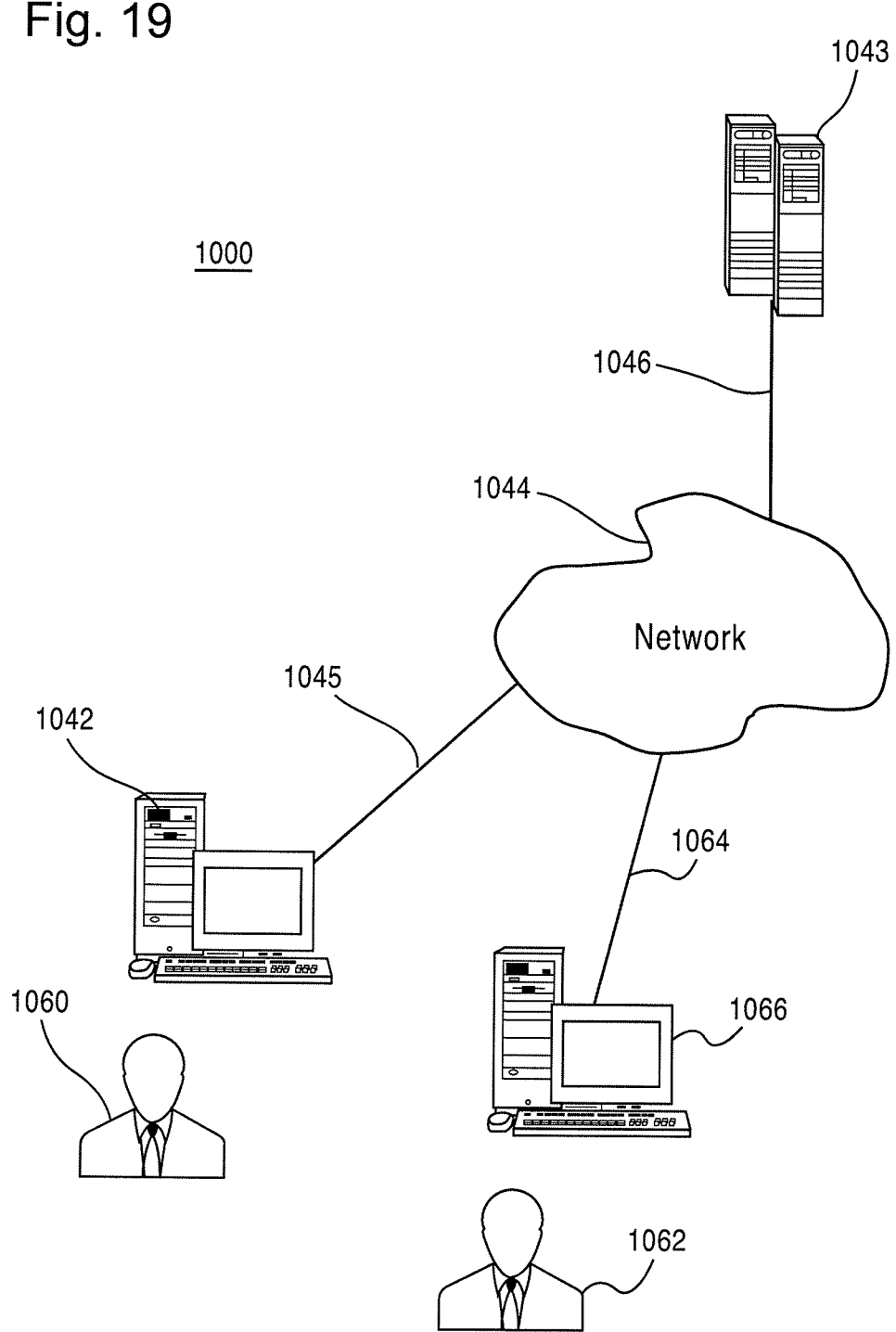
FIG. 19 is a block diagram of various exemplary system components for use in accordance with aspects of the present invention.

FIG. 19 shows a communication system 400 usable in accordance with aspects of the present invention. The communication system 400 includes one or more accessors 460, 462 (also referred to interchangeably herein as one or more "users") and one or more terminals 442, 466. In one aspect, data for use in accordance with some variations of the present invention is, for example, input and/or accessed by accessors 460, 464 via terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, or other device having a processor and a repository for data and/or connection to a repository for data, via, for example, a network 444, such as the Internet or an intranet, and couplings 445, 446, 464. The couplings 445, 446, 464 include, for example, wired, wireless, or fiber optic links. In another aspect, the method and system in accordance with aspects of the present invention operate in a stand-alone environment, such as on a single terminal.

EXAMPLES

Exemplary implementations in accordance with aspects of the invention will now be further described with respect to the following non-limiting examples.

The following data have been obtained by working with a prototype feature reduction method, and two published data sets. These experiments demonstrate that the feature reduction method matches or exceeds any other method available for analysis.

1. Feature Selection for AML/ALL

Using the gradient to assess feature importance is a wrapper and takes into account joint information to identify the best groups of genes has been developed in accordance with the methods of the invention, and has been incorporated into a query engine. In order to compare this method to current technology, such as the Weka package, the AML/ALL data set was obtained. This data was processed and the results compared to other published methods for the same set.

Training data had 38 samples, 11 AML and 27 ALL, obtained from bone marrow. Testing data had 34 examples, 14 AML samples, and 20 ALL samples. 10 of the test set were from peripheral blood, and 24 from bone marrow. The array used contained probes for 7,129 genes.

The joint wrapper method of the invention obtained complete success in separation of both training and testing data while reducing from 7,129 genes to the optimal set of 32. This includes the ability to correctly classify all testing samples, even those created from peripheral blood, while all training examples were bone marrow samples. This demonstrates a good capacity for generalization across somewhat variant methods of sample collection, which will be a key ability for a query system. For demonstration of its success with minimal data, 90% by LOO and 94% on the test set is achieved with a single gene, the greatest test set success reported by any method for a single gene.

A few other published methods had previously achieved 100% success on this data set, limiting its ability to discriminate effectively among the top classifiers. The data set is used in this benchmark because it has been extensively published with other methods, including the Weka package. Note that the other methods achieving full separation on both test and training sets are not necessarily suited to querying because they are choosing very minimal feature sets that would limit the detection of more distant relationships in the context of a query. However, many of these methods are also not available in a form readily usable by a biologist.

TABLE 1

| Method | % Train success by LOO | % Test set success | Number of features |
|---|---|---|---|
| Proposed wrapper | 100 | 100 | 32 optimal |
|  | 90 | 94 | 1 minimum |
| Voting machine |  | 85 | 50 |
| Weka SMO-c |  | 91 | 1 |
| Weka SMO-wrapper |  | 88 | 2 |
| Weka SVM-b |  | 88 | 25 |
| 1normal SVM | 95 | 94 | 17 |
| UR SVM | 95 | 91 | 22 |
| RFE | 95 | 97 | 31 |
| Emerging pattern |  | 91 | 1 |
| Bayesian selection |  | 97 | 5 |
| MAMA | 97 | 100 | 185 |
| Random forest |  | 95 |  |
| E-RFE | 100 | 100 | 8 |
| RFE | 100 | 100 | 8 |
| Ridge regression | 100 | 100 | 8 |

The optimized adjustable SMO developed in accordance with the present invention results in exceptional performance and generalization. In combination with the joint information wrapper, these methods exceed the performance of voting machine, decision tree learner, naïve Bayes, SMO-CFS, SMO-wrapper, SVM, RFE, 1-norm SVMs, UR, emerging pattern, Bayesian variable selection, MAMA, and random forest, although any of these methods may be adapted for use in accordance with the present invention.

The methods that achieved equal success to the joint information wrapper/optimized SMO (100% on both train and test sets) on this relatively easy data set were RFE, E-RFE, and ridge regression. However, these other methods may not be ideal for a query engine since they focused on achieving minimal data sets, and chose the smallest for which leaveone-out (LOO) validation first achieved 100% on the training data. Ridge regression also explicitly penalizes or removes genes considered redundant or highly correlated. To obtain a minimal classifier, this is appropriate. However, in a search to detect distant biological relationships the elimination of redundancy may be undesirable by reducing the opportunities to detect these relationships.

2. Speed Compared to Weka Package

Wang et al. published tables of speed for the wrapper methods of feature reduction that they were able to utilize in the Weka package. (See "Gene selection from microarray data for cancer classification—a machine learning approach," Computational *Biology and Chemistry*, 29:37-46 (2005).) The methods of the present invention far exceed the speed of any algorithm shown in this paper by orders of magnitude. All times in the table below are given in seconds. Note: the proposed new method was run on a bench top computer. The times include all feature reduction, training and classification processes.

TABLE 2

| Methods | Time in seconds |
| --- | --- |
| Proposed new method | 18 |
| CFS | 672 |
| Weka J48 | 3,839 |
| Weka naïve Bayes | 4,867 |
| Weka SMO | 60,229 |

3. Sarcopenia Data Set Classification

Sarcopenia (age-related muscle deterioration) has proven to be a difficult problem even with the use of gene expression technology. New methods have been proposed to analyze the data obtained by gene expression experiments. For this experiment, the data sets were downloaded from NCBI GEO. The training data consisted of 32 samples from muscle biopsies of 12 elderly males and 10 samples from younger males. Testing data was from a separate laboratory, 2 years earlier, and consisted of muscle biopsies of 7 elderly males and 8 younger males. The samples were processed on Affymetrix U133A arrays having probe sets for 22,215 human genes.

Giresi et al. introduced a new learning machine with feature selection based on signal to noise ratio and learning accomplished by a KNN method. (See "Identification of a molecular signature of sarcopenia," *Physiol Genomics*, 21:253-256 (2005).) In the table below, the success rate is shown for this, for the new method proposed herein, and for a control. The training set success was scored by LOO and LTO (leave-two-out, where each possible pair of one positive and one negative training example is left out in turn), and for the test set as a percentage. The control consisted of 20 trials of the new method with the reduced test samples assigned random labels. The results equate to what would be obtained by chance, indicating the success rate with the actual labels achieves a true separation. (Note: one sample has been withdrawn from the test set in GEO because it appeared to be female; the reported success rate of Giresi et al. has been re-calculated without this sample). The data clearly show the superior performance of the proposed new method on this difficult data set.

TABLE 3

| Method | LOO | LTO | Test set | Number of genes |
| --- | --- | --- | --- | --- |
| Proposed new method | 100 | 100 | 93 | 28 |
| KNN-signal to noise | | 85 | 80 | 45 |
| New method random label control, 20 trials | 52 | | 50 | 28 |

4. Relevance of Selected Features

The highest ranking feature obtained by the new method on the leukemia data set was myeloperoxidase, previously documented as prognostic for myeloid leukemia. The highest ranking feature by most other methods is zyxin, since it is the single individual gene with the greatest correlation to class in the training data, but it does not generalize as well to the test set. Despite its original identification in 1999, there remains no other type of evidence linking it to leukemia.

For the sarcopenia study, the comparison of selected genes by the two methods is given below. Included in the 28 genes selected by the new method are several clearly documented already in the disease literature, such as the top gene, myosin, and eukaryotic elongation factor 1a. The processes of muscle contraction, protein turnover, and muscle structure and energy metabolism have all been cited in the literature as key in the disease process. By comparison, the original study found no genes known to be disease-associated, or previously documented in the literature.

TABLE 4

| KNN-SIGNAL TO NOISE-45 GENES | PROPOSED NEW METHOD-28 GENES |
| --- | --- |
| Inflammation/apoptosis (9) | structural components of muscle (3) |
| RNA binding/splicing (5) | Muscle contraction (6) |
| Steroid receptor activity (3) | Protein synthesis/degradation (4) |
| Wnt signaling (2) | Energy metabolism (10) |
| Other (26) | Transcription factors (1) |
| | Molecules of unknown function (2) |
| | Ferritin-related (2) |

5. Query Identified Key Factor in Progression of Pancreatic Cancer

A prototype query trained on pancreatic cancer samples returns a strong similarity to neutrophil gene expression, suggesting that a mechanism recently shown to be crucial for pancreatic cancer progression in mice may also be occurring in human pancreatic cancer.

To establish a sample database for searching, 1500 microarray records were downloaded from NCBI's GEO repository. These included a variety of disease samples and a normal tissue atlas. The pancreatic cancer data set GDS1355 was chosen for training. A query was then run using the trained pattern against the test database.

An important gene list consisting of 38 genes gave the optimum training results. The majority of the top ranked matches selected from the sample database came from an experiment on neutrophils, GDS1428.

A strong match of the pancreatic cancer gene pattern to neutrophils is an unexpected result. One possible explanation is that neutrophils are invading the tumor tissue, and that this distinction between normal and diseased tissue might be merely a secondary immune response rather than a central component of the disease process. However, it has been recently demonstrated in a mouse model that invasion of neutrophils is key to the progression of pancreatic cancer in mice (Nozawa et al., "Infiltrating neutrophils mediate the initial angiogenic switch in a mouse model of multistage carcinogenesis," *PNAS* 103:12493 (2006)), not merely a secondary effect. The invading neutrophils secrete matrix metalloproteinase 9 (MMP-9), and this triggers an initial step in angiogenesis. Further, invading neutrophils were a relatively small percentage of the cells within the angiogenic islets (0.1-0.4%), yet their ablation in pre-malignant lesions markedly reduced the frequency of initial angiogenic switching.

Among the genes chosen for the important gene list by the GeneBrain query from the human pancreatic cancer samples is human MMP-1. This member of the human matrix metalloproteinase family has recently been implicated in blood vessel growth in breast cancer and its metastasis. (Gupta et al., "Mediators of vascular remodeling co-opted for sequential steps in lung metastasis," *Nature* 446:765 (2007).) MMP-1 has also been suggested as a marker for breast lesions that can develop into cancer. (Poola et al., "Identification of MMP-1 as a putative breast cancer predictive marker by global gene expression analysis," *Nat Med* 11:481 (2005).)

Many other genes expressed in neutrophils as well as genes implicated in pancreatic and other types of cancer are present on the list, yielding a fertile source of hypotheses about pancreatic cancer.

By retrospective analysis, the machine learning methods of the invention have identified an aspect of pancreatic cancer progression previously demonstrated in mice where the presence of invading neutrophils provides a key angiogenic switch mediated by a matrix metalloproteinase, suggesting that the same or similar mechanism may occur in human pancreatic cancer.

6. Multiple Methods for Choosing Optimum Machines

Multiple training sessions were conducting using a support vector machine modified to output various measures and parameters during training. First, divergence as a measure was compared to measures in common usage, such as leave one out cross validation and the use of a test set. A graphical representation of the results is given in FIG. 16. It was observed that there are many different trained machines for which the assessment of the success rate obtained by leave one out cross validation is equal. Thus, this is not a good discriminator to use in deciding the optimum machine. Use of a test set is another common method to choose the optimum machine, and again it was observed that over a large number of trained machines give identical results on the test set. The use of divergence, however, shows a sharp peak of success and can therefore was more successful in discriminating among trained machines and permitted the selection an optimum solution.

Figure 17:
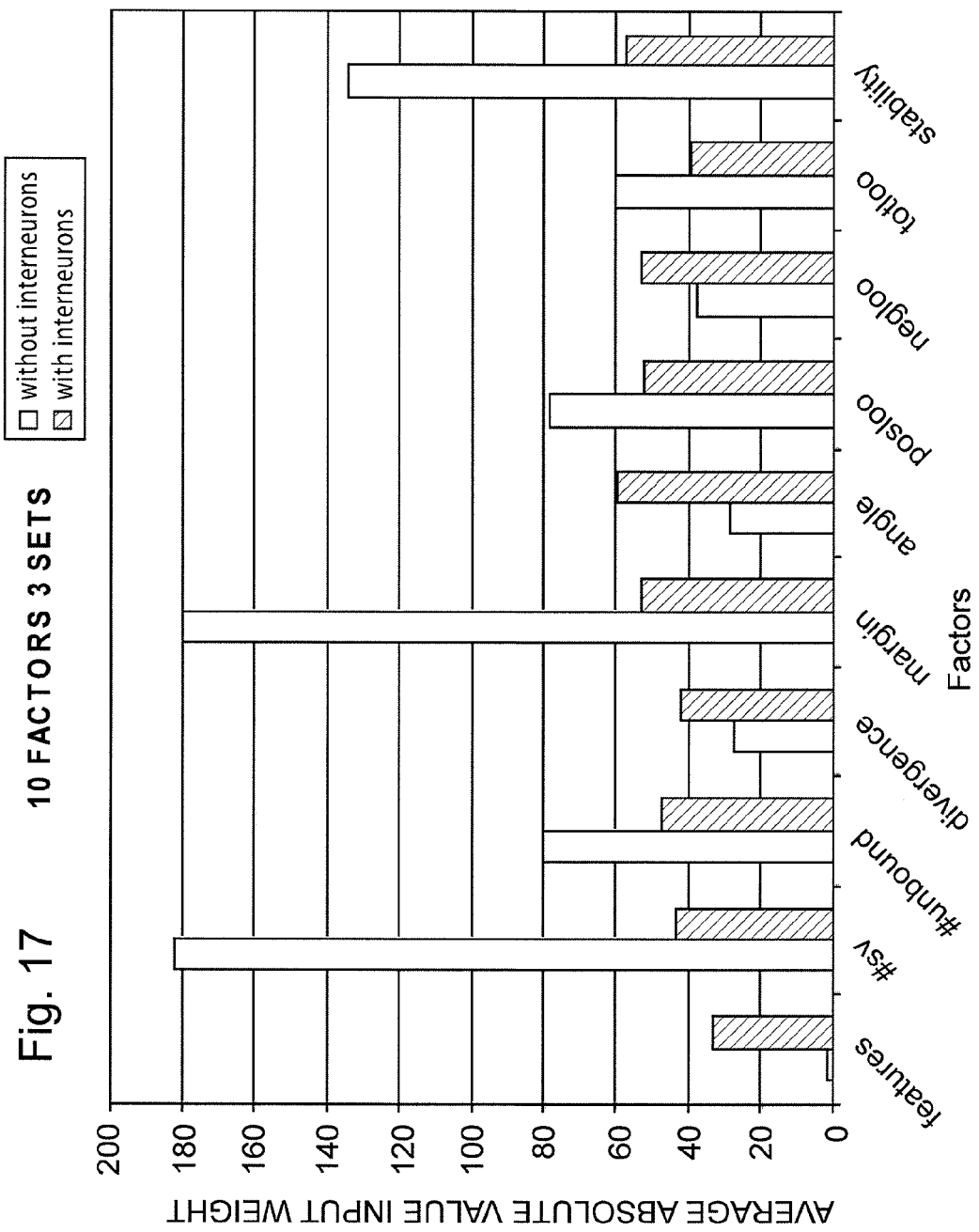
FIG. 17 is a diagram of the weights obtained by training a neural network to discriminate among trained machines based on values output during multiple training sessions, in accordance with aspects of the present invention. Two types of neural networks are compared in this example, one with and one without the use of interneurons. Ten factors are used to discriminate among the trained machines.

Next, the training machine was modified to put out 10 different parameters with to consider as measures of training success. This data was collected for multiple training sessions on each of multiple training data sets. The output data was then used to train neural networks created using Matlab's neural network toolbox. A neural network assigns weights to each input factor. Thus the results of each simple trained neural network are a set of weights assigned to each input value. The results are shown graphically in FIG. 17 for both a simple neural network and for a neural network with one layer of interneurons. These weights assigned by the neural network to each factor thus permitted a sophisticated assessment of the likelihood of success for any new training sessions by using mathematical combinations of all ten assessment measures to select the optimum trained machine.

7. Adjusting Weights within the Core of the SMO, and by Use of the Diagonal

Adjusting the weights within the core of the SMO or by use of the diagonal allows the incorporation of prior knowledge about the data to create an improved classifier. For example, it is common with biomedical data for there to be a range of quality within the sample and adjusting the weights of these samples when training can be very influential on the resulting classifier.

Figure 12:
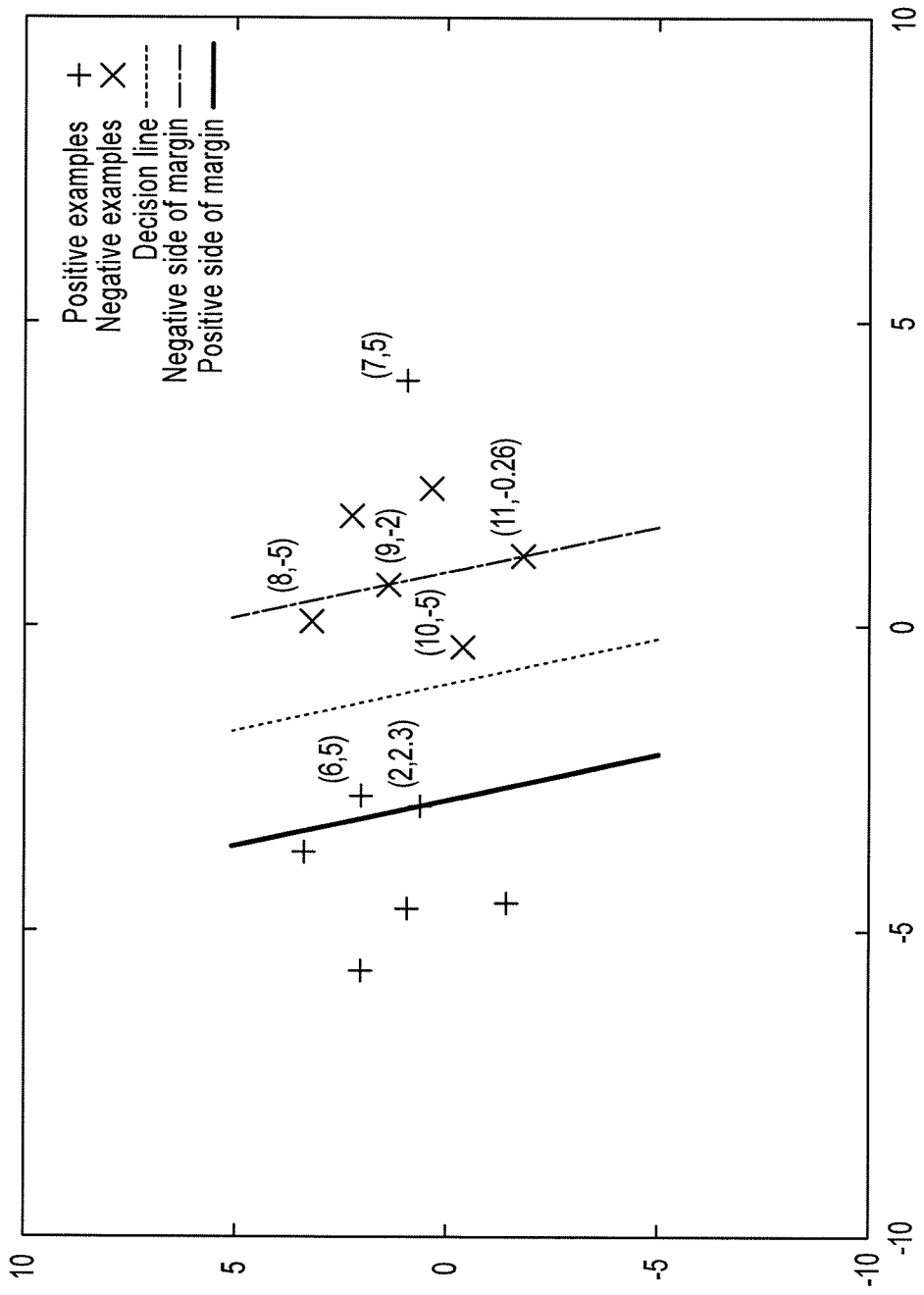
FIG. 12 is a graph depicting points in space having boundaries that are created by a classifier, in accordance with aspects of the present invention. In this example, positive points are shown as red +'s, negative points are shown as blue x's. The first number associated with each point is an identifier. The bound for all points was 5. Point 7 is on the "wrong" side of the boundary between the classes (dotted line) and is misclassified.
Figure 13:
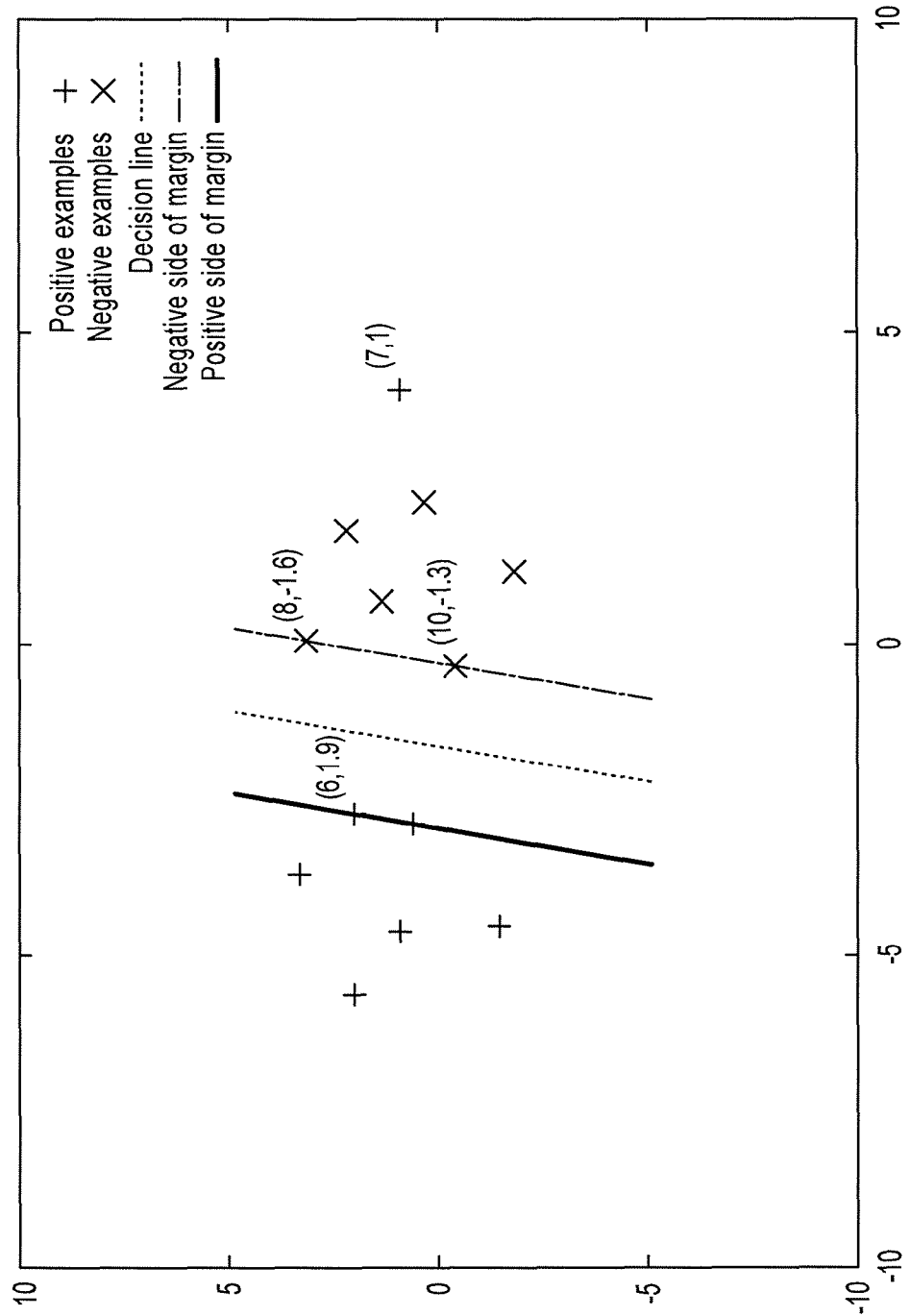
FIG. 13 is a graph depicting points in space having boundaries that are created by a classifier, in accordance with aspects of the present invention. Positive points in this example are shown as red +'s, negative points are shown as blue x's. The first number associated with each point is an identifier. The bound for all points was 5, except for point 7, which previously fell on the wrong side of the boundary. After assigning point 7 a lesser bound within the SMO to limit its influence, the classifier is able to create a better boundary between positive and negative points as compared to FIG. 12.

The modification of the SMO algorithms allows us to assign an upper limit on the effect of each sample. This may be useful for corrupt or noisy data, which may nonetheless contribute some meaningful information to the trained SVM. In this example, two separate trainings are illustrated, one with the bounds equal for all points, and another training with a smaller bound on a single noisy data point (sample #7 in FIG. 12). As can be seen, the decision boundary was improved by limiting the influence of the noisy sample (sample #7 in FIG. 13).

For this example, in the first classification the bounds were 5 for all points and the diagonals were zero. Adjusting the bound to 1 for point 7 created an observable improvement in the classifier.

Figure 14:
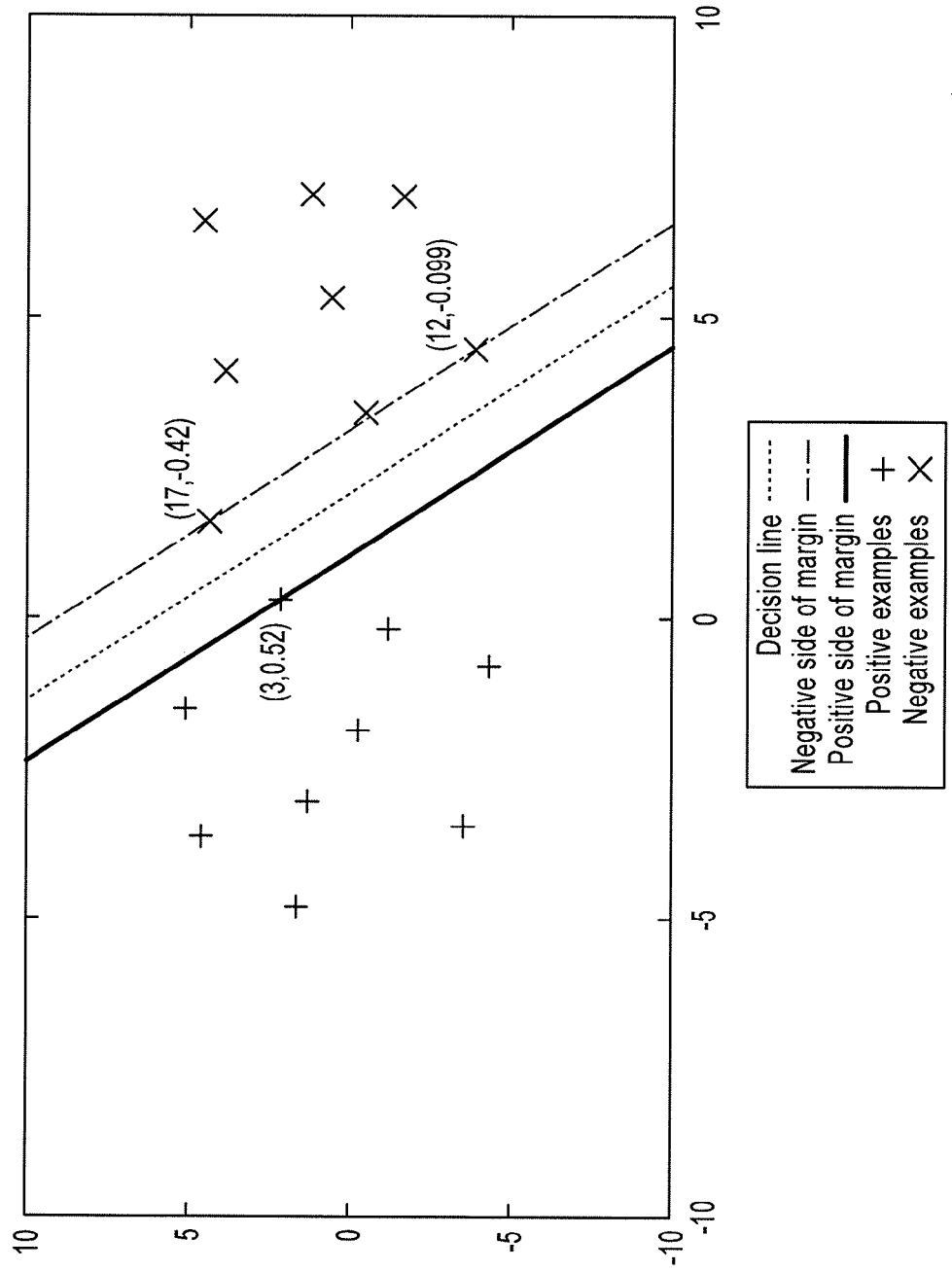
FIG. 14 is a graph depicting a similar separable problem in which noisy point 17 is heavily influencing the decision line (black), in accordance with aspects of the present matter.
Figure 15:
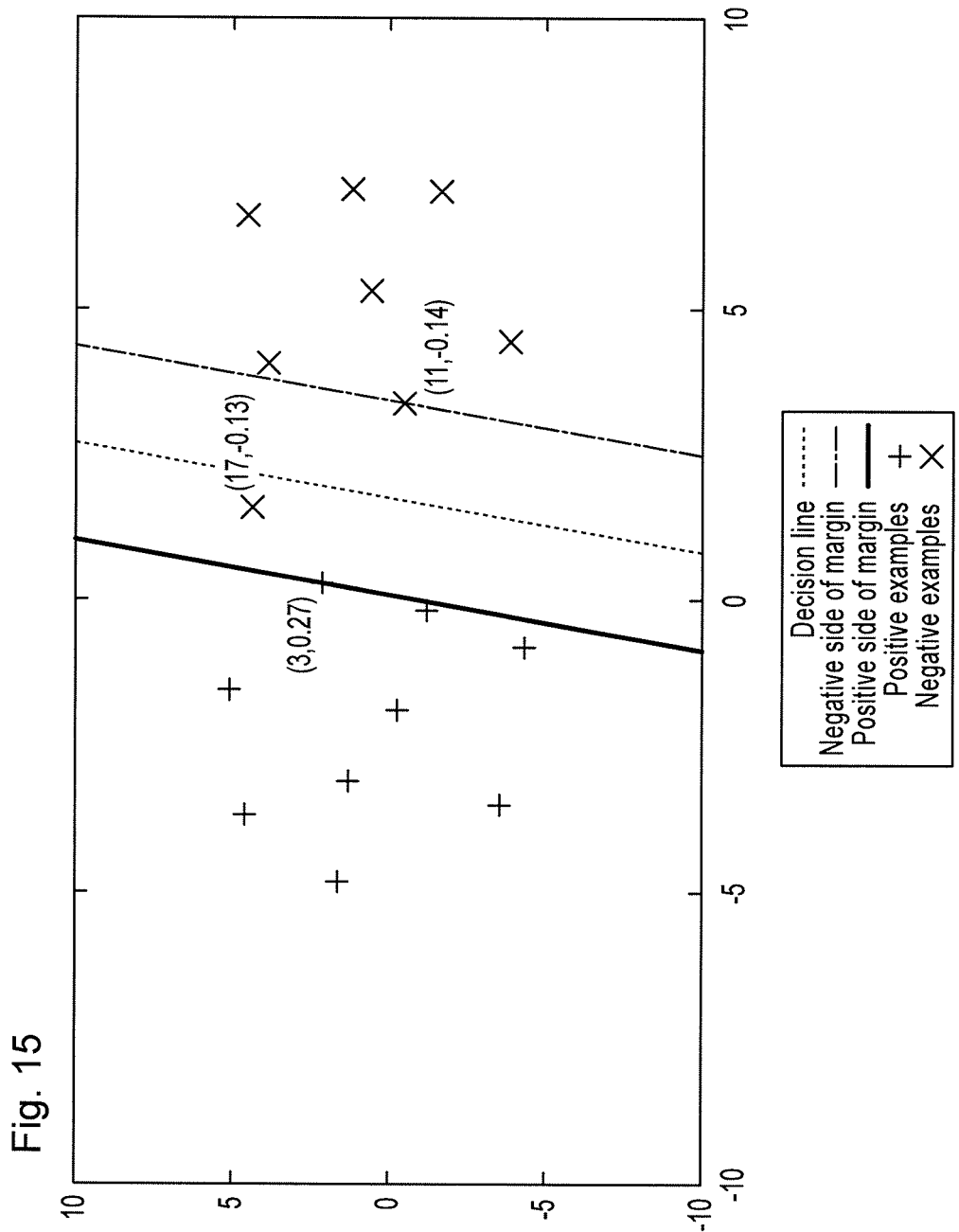
FIG. 15 is a graph depicting a similar separable problem as shown in FIG. 14, but using a soft margin by adding a diagonal term of 10 to the kernel matrix at entry K (17, 17), thereby limiting its influence on the solution.

However, there are times when the data is easily separable by the kernel being used to classify, and then the method of providing upper bounds on the influence of each sample does not alter the resulting solution of the SVM. In that case, and for some other instances, prior knowledge may be incorporated and an improved solution may be obtained by adding to the diagonal terms of the kernel matrix, thereby regularizing noisy data points and providing more stable decision boundary. An example of this is provided in FIGS. 14 and 15. In FIG. 14, no adjustment has been made to the diagonal terms, and bounds are 5 for all points. In FIG. 15, point #17 has been given an addition diagonal term (+10) while leaving the bounds unaltered. This adjustment resulted in a softening of the margin of the SVM along the negative side of the solution, demonstrating an effective method of incorporating prior knowledge.

8. Provision of Additional Negative Samples with Limited Weights

The provision of additional negative samples, either by random generation, database selection or other method described above can be important to generating an accurate classifier or successful query when their numbers in the actual data are limited.

One problem with this approach is that the generated negative examples might by happenstance match the positive class. By providing a preponderance of negative examples each with a low weight this limitation has been addressed. This method of weight adjustment can also be useful when existing numbers of examples are unequal between the classes. Different bounds may be set for each class when the population of the classes differs.

In either case, this method allows the decision line to find equilibrium between the classes, which would otherwise create an unwanted bias in favor of the larger class. This approach is advantageous when positive samples are outnumbered by negative samples. Given an experiment which lacks a negative class altogether, we have proposed a novel method of employing negative examples from a random sampling over the entire feature space. By providing an abundance of random samples, each with an extremely weak bound in comparison with the positive samples, a negative region can be defined, and a decision boundary for membership in the positive class can be obtained.

Figure 16:
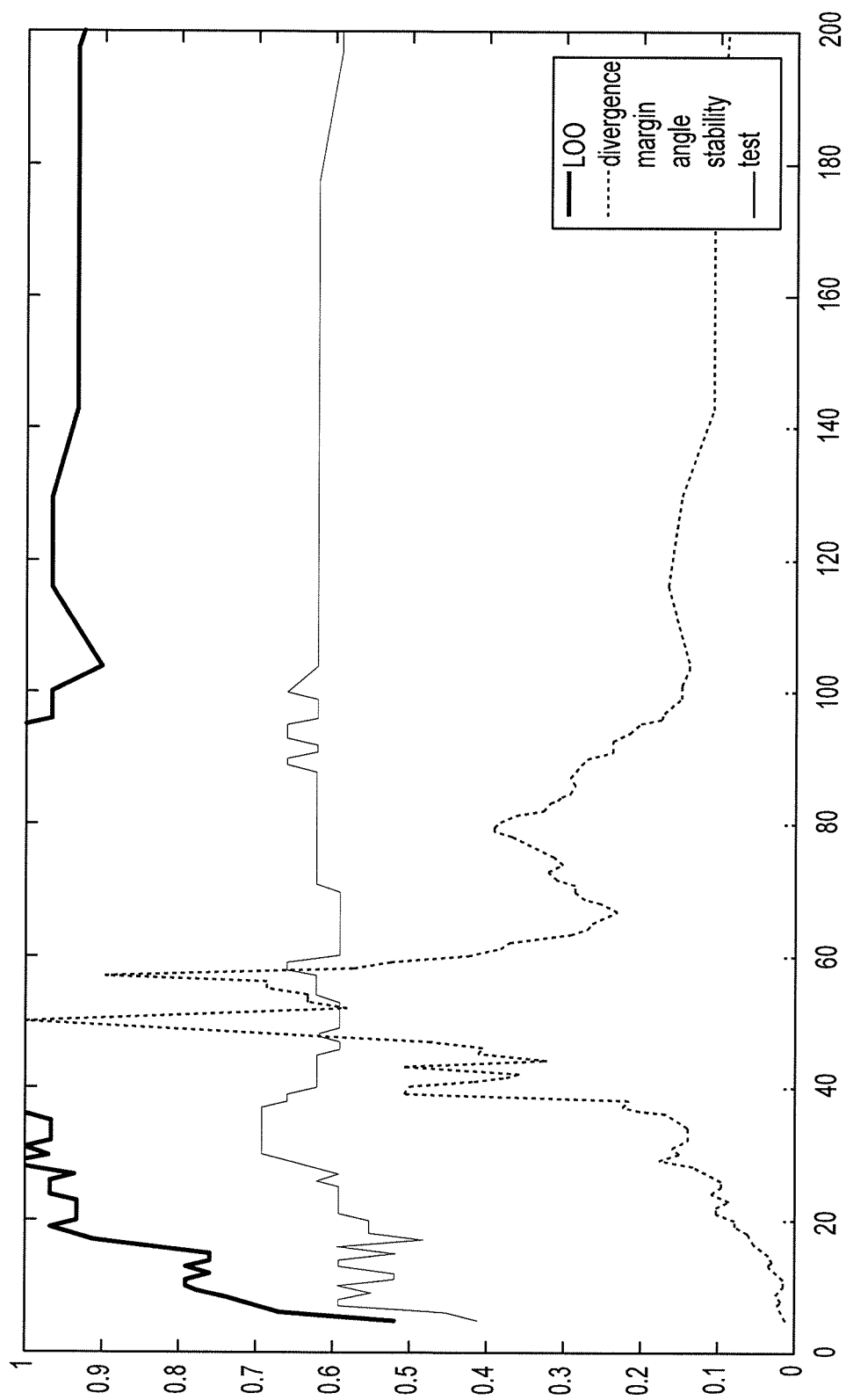
FIG. 16 is a graph depicting the improved sensitivity of divergence (black line) over the common methods of using a test set (purple line) or leave-one-out cross validation (maroon line) as a discriminator for choosing among alternative trained machines, in accordance with aspects of the present invention.

This has been done, and the results are shown in FIG. 16. The bounds are set to 30 for the three positive samples and are set to 5 for all of the randomly created negative samples, some of which impinge on the positive area. As can be seen, the classifier was able to effectively define the positive space.

CONCLUSION

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

Aspects of the present invention are capable of considerable modification, alteration, and equivalents in form and function, as will occur to those ordinarily skilled in the pertinent arts having the benefit of this disclosure.

While aspects of the present invention have been described for what are presently considered illustrative implementations, variations of the present invention are intended to cover various modifications and equivalent arrangements included within the spirit and scope of the detailed description provided above.

What is claimed:

1. A machine learning method, comprising:
providing one or more training data samples having one or more known classes;
training two or more learning machines comprising a sequential minimal optimization (SMO) algorithm to identify said one or more known classes using said one or more training data samples;
modifying a core of the learning machine to adjust a weight assigned to individual training samples;
selecting the trained learning machine that optimizes a performance function dependent on one or more variables between said one or more known classes; and
outputting the selected trained learning machine into a computer memory.

2. The method of claim 1, wherein the weight is assigned to the training data sample by a user.

3. The method of claim 1, wherein the weight is automatically assigned based on detection of quality measures within the training data sample.

4. The method of claim 1, wherein the weight of data that contains a high level of noise is reduced.

5. The method of claim 1, wherein the weight of data that comprises a hypothetical negative example is reduced.

6. The method of claim 1, wherein the weight of false positive or false negative errors is increased.

* * * * *